(12) United States Patent
Andersson et al.

(10) Patent No.: US 12,245,078 B2
(45) Date of Patent: Mar. 4, 2025

(54) TRANSMIT FORMAT FOR MULTI-SEGMENT PUSCH

(71) Applicant: TELEFONAKTIEBOLAGET LM ERICSSON (PUBL), Stockholm (SE)

(72) Inventors: Mattias Andersson, Sundbyberg (SE); Yufei Blankenship, Kildeer, IL (US); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 850 days.

(21) Appl. No.: 17/429,730

(22) PCT Filed: Feb. 13, 2020

(86) PCT No.: PCT/IB2020/051207
§ 371 (c)(1),
(2) Date: Aug. 10, 2021

(87) PCT Pub. No.: WO2020/165835
PCT Pub. Date: Aug. 20, 2020

(65) Prior Publication Data
US 2022/0210697 A1 Jun. 30, 2022

Related U.S. Application Data

(60) Provisional application No. 62/806,667, filed on Feb. 15, 2019.

(51) Int. Cl.
*H04W 28/06* (2009.01)
*H04W 72/04* (2023.01)
*H04W 72/0446* (2023.01)

(52) U.S. Cl.
CPC ..... *H04W 28/065* (2013.01); *H04W 72/0446* (2013.01)

(58) Field of Classification Search
CPC ........... H04W 28/065; H04W 72/0446; H04W 72/1263; H04W 72/23; H04L 5/0044; H04L 5/0091
See application file for complete search history.

(56) References Cited

U.S. PATENT DOCUMENTS 10,932,246 B2 * 2/2021 Gao ................. H04W 72/0446
11,218,287 B2 * 1/2022 Zhao ..................... H04L 5/0007

FOREIGN PATENT DOCUMENTS

CN 103299574 A 9/2013
CN 107926037 A 4/2018
(Continued)

OTHER PUBLICATIONS

Nokia et al: "Summary of offl i ne discussion on 7.2.6.1.3 potential enhancements for PUSCH for NR URLLC", 3GPP Draft; RI-1901398 Summary of Offline Discussion on 7.2.6.1.3 URLLC PUSCH ENh, 3rd Generation Partnership Project (3GPP), Mobile Competence Centre ' 650, Route Des Lucio Les' F-06921 Sophia-Anti Po vol. RAN WGI, No. Taipei, Taiwan; Jan. 21, 2019-Jan. 25, 2019 Jan. 23, 2019 (Jan. 23, 2019), XP051601315, Retrieved from the Internet:URL:http://www.3gpp.org/ftp/tsg%5Fran/, 24 pages.
(Continued)

Primary Examiner — Ahmed Elallam

(57) ABSTRACT

Devices and methods of operating a network node in a wireless telecommunication network are provided herein. Such methods include generating (710) a configuration message that includes transmit format data corresponding to a multiple segment transmission on a physical shared channel. The transmit format data includes at least one of transport block size data, TBS, determination data, redundancy version, RV, determination data, starting point and length of PUSCH transmission data, time domain resource allocation, TDRA, table data, and/or demodulated reference signal, DMRS data. Methods include initiating (720) the (Continued)

transmission of the configuration message to a user equipment, UE, to identify the transmit format data for the multiple segment transmission.

19 Claims, 22 Drawing Sheets

(56) References Cited

FOREIGN PATENT DOCUMENTS

| | | |
|---|---|---|
| CO | 2017005562 A2 | 8/2017 |
| JP | 2020518167 A | 6/2020 |
| RU | 2559201 C2 | 8/2015 |
| WO | 2015052248 A1 | 4/2015 |
| WO | 2018085044 A1 | 5/2018 |
| WO | 2018200748 A1 | 11/2018 |
| WO | 2018229691 A1 | 12/2018 |
| WO | 2019029674 A1 | 2/2019 |

OTHER PUBLICATIONS

Nokia et al: "On PUSCH enhancements for NR URLLC", 3GPP Draft; RI-1900929 NR URLLC PUSCH Repetition ENH, 3rd Generation Partnership Project (3GPP), Mobile Competence Centre ; 650, Route Des Lucioles ; F-06921 Sophia-Antipolis Cedex ; France' vol. RAN WGI, No. Taipei, Taiwan; Jan. 21, 2019-Jan. 25, 2019 Jan. 20, 2019 (Jan. 20, 2019), XP051593773, Retrieved from the Internet:URL:http://www.3gpp.org/ftp/Meetings%5F3GP P%5FSYNC/RAN1/Docs/R1%2D1900929%2Ezip, 8 pages.
Ericsson: "PUSCH Enhancements for NR URLLC", 3GPP Draft; RI-1900160 PUSCH Enhancements for NR URLLC, 3rd Generation Partnership Project (3GPP), Mobile Competence Centre , 650, Route Des Lucioles ; F-06921 Sophia-Antipolis Cedex ; France ' vol. RAN WGI, No. Taipei, Taiwan; Jan. 21, 2019-Jan. 25, 2019 Jan. 20, 2019 (Jan. 20, 2019), XP051593086, Retrieved from the Internet:URL:http://www.3gpp.org/ftp/Meetings%5F3GP P%5FSYNC/RAN1/Docs/R1%2D1900160%2Ezip, 13 pages.
VIVO, "PUSCH enhancements for URLLC", 3GPP TSG-RAN Wg Ad-Hoc Meeting 1901, Taipei, Tawain, Jan. 21-25, 2019, R1-1900128, pp. 1-8, 3GPP.
3GPP, "Technical Specification Group Radio Access Network; NR; Physical layer procedures for data (Release 15)", Technical Specification, 3GPP TS 38.214 V15.2.0, Aug. 2018, pp. 1-95, 3GPP, France.
3GPP, "3rd Generation Partnership Project; Technical Specification Group Radio Access Network; NR; Physical layer procedures for data (Release 15)", 3GPP TS 38.214 V15.4.0, Dec. 2018, pp. 1-102.
Huawei et al., "PUSCH enhancements for URLLC", 3GPP TSG RAN WG1 Meeting #94, Gothenburg, Sweden, Aug. 20-24, 2018, pp. 1-4, R1-1809344, 3GPP, France.
Sharp, "Views on potential enhancements to PUSCH for eURLLC", 3GPP TSG-RAN WG2 #101Bis, Taipei, Taiwan, Jan. 21-25, 2019, pp. 1-9, R1-1900834, 3GPP, France.
Sony, "L1 enhancements on PUSCH for URLLC", 3GPP TSG RAN WG1 Ad-Hoc Meeting 1901, Taipei, Taiwan, Jan. 21-25, 2019, pp. 1-5, R1-1900372, 3GPP, France.

* cited by examiner

| Symbol | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| TDD Pattern | U | U | U | U | D | D | D | D | G | G | U | U | U | U | U | U | U | U | D | D | D | D | G | G | U | U | U | U |
| Segment | 0 | 0 | 0 | 0 | | | | | | | 1 | 1 | 1 | 1 | 2 | 2 | 2 | 2 | | | | | | | 3 | 3 | 3 | 3 |

Figure 21

TRANSMIT FORMAT FOR MULTI-SEGMENT PUSCH

RELATED APPLICATION

This application is a 371 of International Application No. PCT/IB2020/051207, filed Feb. 13, 2020, which claims the benefit of U.S. Application No. 62/806,667, filed Feb. 15, 2019, the disclosures of which are fully incorporated herein by reference.

FIELD OF DISCLOSURE

The present disclosure relates generally to communications, and more particularly, to wireless communications and related wireless devices and network nodes.

BACKGROUND

New radio (NR) standard in 3GPP is being designed to provide service for multiple use cases such as enhanced mobile broadband (eMBB), ultra-reliable and low latency communication (URLLC), and machine type communication (MTC). Each of these services MAY have different technical requirements. For example, the general requirement for eMBB may be a high data rate with moderate latency and moderate coverage, while URLLC service may rely on a low latency and high reliability transmission, but may only need moderate data rates.

One of the solutions for low latency data transmission includes shorter transmission time intervals. In NR, in addition to transmission in a slot, a mini-slot transmission may also allowed to reduce latency. A mini-slot may consist of any number of 1 to 14 OFDM symbols. It should be noted that the concepts of slot and mini-slot are not specific to a specific service meaning that a mini-slot may be used for either eMBB, URLLC, and/or other services.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 21 is a block diagram illustrating segmenting with more than one UL period in a slot according to some embodiments.

SUMMARY

Figure 1:
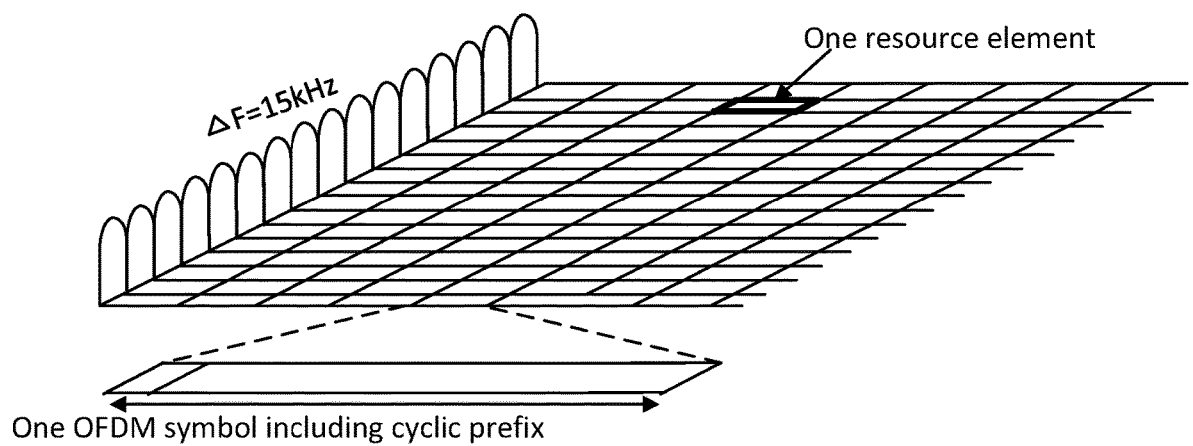
FIG. 1 is an example radio resource in NR according to some embodiments herein.

Embodiments herein are directed Some embodiments herein are directed to methods of operating a network node in a wireless telecommunication network. Such methods include generating a configuration message that includes transmit format data corresponding to a multiple segment transmission on a physical shared channel. The transmit format data includes at least one of transport block size data, TBS, determination data, redundancy version, RV, determination data, starting point and length of transmission data, time domain resource allocation, TDRA, table data, and/or demodulated reference signal, DMRS data. Methods include initiating the transmission of the configuration message to a user equipment to identify the transmit format data for the multiple segment transmission.

In some embodiments, the physical shared channel includes a physical uplink shared channel, PUSCH.

Some embodiments provide that the multiple segment physical shared channel includes physical downlink shared channel, PDSCH.

In some embodiments, the TBS determination data is determined by $N'_{RE}(\Sigma_{i=1}^{N_t} N_{SC}^{RB} \cdot N_{symb,i}^{sh} - N_{DMRS,i}^{PRB}) - N_{oh}^{PRB}$ where $N_{symb,i}^{sh}$ is a number of symbols of the PUSCH allocation in slot i, and $N_{DMRS,i}^{PRB}$, is a number of Res for DM-RS per physical resource block, PRB, in the scheduled duration including an overhead of RS CDM groups without data for slot I, and a sum is over all slots in the multiple segment transmission.

Some embodiments provide that the TBS determination data is determined by $N'_{RE} = (\Sigma_{i=1}^{N_t} N_{SC}^{RB} \cdot N_{symb,i}^{sh} - N_{DMRS,i}^{PRB} - N_{oh}^{PRB})$ where $N_{symb,i}^{sh}$ is a number of symbols of a PUSCH allocation in slot i, and $N_{DMRS,i}^{PRB}$ is a number of Res for DM-RS per PRB in the scheduled duration including the overhead of the RS CDM groups without data for slot i, and a sum is over all slots in the multiple segment transmission.

In some embodiments, the TBS determination data is determined by $N'_{RE}(\Sigma_{i=1}^{N_t} N_{SC}^{RB} \cdot N_{symb,i}^{sh} - N_{DMRS,i}^{PRB}) - N_{oh}^{PRB}$ where $N_{symb,i}^{sh}$ is a number of symbols of a PUSCH allocation in a segment or repetition i, and $N_{DMRS,i}^{PRB}$ is a number of Res for DM-RS per PRB in a scheduled duration including an overhead of RS CDM groups without data for segment or repetition i, and a sum is over all segments or repetitions in the multiple segment transmission.

Some embodiments provide that the TBS determination data is determined by $N'_{RE} = (\Sigma_{i=1}^{N_t} N_{SC}^{RB} \cdot N_{symb,i}^{sh} - N_{DMRS,i}^{PRB} - N_{oh}^{PRB})$ where $N_{symb,i}^{sh}$ is a number of symbols of a PUSCH allocation in a segment or repetition i, and $N_{DMRS,i}^{PRB}$ is a number of Res for DM-RS per PRB in a scheduled duration including an overhead of the RS CDM groups without data for segment or repetition i, and a sum is over all segments or repetitions in the multiple segment transmission.

In some embodiments, the RV determination data is determined by an initial RV for an initial PUSCH segment and a next RV in an RV sequence. Some embodiments provide that a radio resource control, RRC, signal provides the initial RV for the initial PUSCH segment. In some embodiments, an RV field in an activation downlink control indicator, DCI, provides the initial RV for the initial PUSCH segment. Some embodiments provide that RVs are allocated to different segments for different transmission opportunities. In some embodiments, a segment with longest length is found, and in other segments in a transmission opportunity use the RV determined by the RV sequence. Some embodiments provide that the RV sequence is used cyclically.

In some embodiments, an SFI, slot format indicator, DCI message is used to determine which symbols are used for UL transmission.

Some embodiments provide that RRC signaling is used to determine which symbols are used for UL transmission.

In some embodiments, symbols used for transmission of SRS are not used for UL transmission.

Some embodiments provide that a set of consecutive symbols in a same slot where a UL transmission is allowed is not allocated to a segment if a resulting segment is shorter than a given number of symbols.

In some embodiments, a DCI provides a starting point S and a length L of a PUSCH transmission.

Some embodiments provide that each segment contains a set of consecutive symbols used for UL transmission, and wherein all symbols in the segment are in the same slot.

In some embodiments, the number and length of PUSCH segments used are determined based on a starting point and length to determine which symbols are used for UL transmission.

Some embodiments provide that a row in the TDRA table is associated with multiple combinations of start symbol identifier and a symbol length value.

In some embodiments, each segment includes a demodulation reference signal, DMRS. Some embodiments provide that the symbols to use for DMRS in each segment are inherited from a DMRS allocation configured for the multiple-segment transmission.

Some embodiments provide that only a first segment in a slot includes a demodulation reference signal, DMRS. In some embodiments, only a first segment in a transmission, and a first segment after a disallowed symbol includes DMRS. Some embodiments provide that a first segment in a slot does not contain DMRS responsive to the previous slot including a segment in the last symbol.

Some embodiments are directed to a base station (gNB) of a wireless communication network. According to some embodiments, the base station includes a transceiver configured to provide wireless network communication with a wireless terminal and a processor coupled with the transceiver. The processor is configured to provide wireless network communications through the transceiver and the processor is configured to perform operations disclosed herein.

Some embodiments are directed to a base station (eNB) of a radio access network.

The base station is adapted to perform operations disclosed herein.

Some embodiments are directed to methods of operating a network node that is configured to provide link adaptation and/or resource reselection based on feedback information from a receiver user equipment. The methods are adapted to perform operations disclosed herein.

Some embodiments are directed to methods of operating a wireless device in a wireless telecommunication network. Methods include receiving a configuration message that includes transmit format data corresponding to a multiple segment transmission on a physical shared channel, the transmit format data comprising at least one of transport block size data, TBS, determination data, redundancy version, RV, determination data, starting point and length of PUSCH transmission data, time domain resource allocation, TDRA, table data, and/or demodulated reference signal, DMRS data. Methods include initiating the multiple segment transmission on the physical shared channel based on the configuration message.

In some embodiments, the physical shared channel includes a physical uplink shared channel, PUSCH.

Some embodiments provide that the multiple segment physical shared channel comprises physical downlink shared channel, PDSCH.

In some embodiments, the TBS determination data is determined by $N'_{RE}(\Sigma_{i=1}^{N_t} N_{SC}^{RB} \cdot N_{symb,i}^{sh} - N_{DMRS,i}^{PRB}) - N_{oh}^{PRB}$ where $N_{symb,i}^{sh}$ is a number of symbols of the PUSCH allocation in slot i, and $N_{DMRS,i}^{PRB}$ is a number of Res for DM-RS per physical resource block, PRB, in the scheduled duration including an overhead of RS CDM groups without data for slot I, and a sum is over all slots in the multiple segment transmission.

Some embodiments provide that the TBS determination data is determined by $N'_{RE}=(\Sigma_{i=1}^{N_t} N_{SC}^{RB} \cdot N_{symb,i}^{sh} - N_{DMRS,i}^{PRB} - N_{oh}^{PRB})$ where $N_{symb,i}^{sh}$ is a number of symbols of a PUSCH allocation in slot i, and $N_{DMRS,i}^{PRB}$, is a number of Res for DM-RS per PRB in the scheduled duration including the overhead of the RS CDM groups without data for slot i, and a sum is over all slots in the multiple segment transmission.

In some embodiments, the TBS determination data is determined by $N'_{RE}=(\Sigma_{i=1}^{N_t} N_{SC}^{RB} \cdot N_{symb,i}^{sh} - N_{DMRS,i}^{PRB}) - N_{oh}^{PRB}$ where $N_{symb,i}^{oh}$ is a number of symbols of a PUSCH allocation in a segment or repetition i, and $N_{DMRS,i}^{PRB}$ is a number of Res for DM-RS per PRB in a scheduled duration including an overhead of RS CDM groups without data for segment or repetition i, and a sum is over all segments or repetitions in the multiple segment transmission.

Some embodiments provide that the TBS determination data is determined by $N'_{RE}=(\Sigma_{i=1}^{N_t} N_{SC}^{RB} \cdot N_{symb,i}^{sh} - N_{DMRS,i}^{PRB} - N_{oh}^{PRB})$ where $N_{symb,i}^{oh}$ is a number of symbols of a PUSCH allocation in a segment or repetition i, and $N_{DMRS,i}^{PRB}$ is a number of Res for DM-RS per PRB in a scheduled duration including an overhead of the RS CDM groups without data for segment or repetition i, and a sum is over all segments or repetitions in the multiple segment transmission.

In some embodiments, the RV determination data is determined by an initial RV for an initial PUSCH segment and a next RV in an RV sequence. Some embodiments provide that a radio resource control, RRC, signal provides the initial RV for the initial PUSCH segment. In some embodiments, an RV field in an activation downlink control indicator, DCI, provides the initial RV for the initial PUSCH segment. Some embodiments provide that RVs are allocated to different segments for different transmission opportunities, wherein a segment with longest length is found, and wherein other segments in a transmission opportunity use the RV determined by the RV sequence. In some embodiments, the RV sequence is used cyclically.

In some embodiments, an SFI, slot format indicator, DCI message is used to determine which symbols are used for UL transmission.

Some embodiments provide that RRC signaling is used to determine which symbols are used for UL transmission.

In some embodiments, symbols used for transmission of SRS are not used for UL transmission.

Some embodiments provide that a set of consecutive symbols in a same slot where a UL transmission is allowed is not allocated to a segment if a resulting segment is shorter than a given number of symbols.

In some embodiments, a DCI provides a starting point S and a length L of a PUSCH transmission.

Some embodiments provide that each segment contains a set of consecutive symbols used for UL transmission and all symbols in the segment are in the same slot.

In some embodiments, the number and length of PUSCH segments used are determined based on a starting point and length to determine which symbols are used for UL transmission.

Some embodiments provide that a row in the TDRA table is associated with multiple combinations of start symbol identifier and a symbol length value.

In some embodiments, each segment includes a demodulation reference signal, DMRS. Some embodiments provide that the symbols to use for DMRS in each segment are inherited from a DMRS allocation configured for the multiple-segment transmission.

In some embodiments, only a first segment in a slot includes a demodulation reference signal, DMRS.

Some embodiments provide that only a first segment in a transmission, and a first segment after a disallowed symbol includes DMRS.

In some embodiments, a first segment in a slot does not contain DMRS responsive to the previous slot including a segment in the last symbol.

Some embodiments are directed to a wireless device that includes a transceiver configured to provide wireless network communication with a wireless communication network and a processor coupled with the transceiver. The processor is configured to provide wireless network communication through the transceiver, and is configured to perform operations disclosed herein.

As provided herein, technical advantages of defining a multi-segment PUSCH transmission for both dynamically scheduled PUSCH and for PUSCH that are associated with an UL configured grant (CG) are realized.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Reference is now made to FIG. 1, which is an example radio resource in NR according to some embodiments herein. In Rel-15 NR, a UE can be configured with up to four carrier bandwidth parts in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWPj}^{size}-1$, where i is the index of the carrier bandwidth part. A resource block (RB) is defined as 12 consecutive subcarriers in the frequency domain.

Multiple OFDM numerologies, μ, are supported in NR as given by Table 1, where the subcarrier spacing, Δf, and the cyclic prefix for a carrier bandwidth part are configured by different higher layer parameters for downlink and uplink, respectively.

TABLE 1

Supported transmission numerologies.

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

A downlink physical channel corresponds to a set of resource elements carrying information originating from higher layers. The following downlink physical channels are defined:

Physical Downlink Shared Channel, PDSCH
Physical Broadcast Channel, PBCH
Physical Downlink Control Channel, PDCCH PDSCH may be the primary physical channel used for unicast downlink data transmission and may also be used for the transmission of RAR (random access response), certain system information blocks, and/or paging information, among others. PBCH may carry the basic system information, required by the UE to access the network. PDCCH may be used for transmitting downlink control information (DCI). For example, the PDCCH may be used to transmit scheduling decisions that may be needed for reception of PDSCH and for uplink scheduling grants for enabling transmission on PUSCH.

An uplink physical channel corresponds to a set of resource elements carrying information originating from higher layers. The following uplink physical channels are defined:

Physical Uplink Shared Channel, PUSCH:
Physical Uplink Control Channel, PUCCH
Physical Random Access Channel, PRACH PUSCH is the uplink counterpart to the PDSCH. PUCCH is used by UEs to transmit uplink control information, including HARQ acknowledgements, channel state information reports, etc. PRACH is used for random access preamble transmission.

In general, a UE shall determine the RB assignment in the frequency domain for PUSCH or PDSCH using the resource allocation field in the detected DCI carried in PDCCH. For PUSCH carrying msg3 in a random-access procedure, the frequency domain resource assignment may be signaled by using the UL grant contained in RAR.

In NR, two frequency resource allocation schemes, type 0 and type 1, are supported for PUSCH and PDSCH. Which type to use for a PUSCH/PDSCH transmission may be defined either by an RRC configured parameter or indicated directly in the corresponding DCI or UL grant in RAR (for which type 1 is used).

The RB indexing for uplink/downlink type 0 and type 1 resource allocation may be determined within the UE's active carrier bandwidth part, and the UE shall upon detection of PDCCH intended for the UE determine first the uplink/downlink carrier bandwidth part and then the resource allocation within the carrier bandwidth part. The UL BWP for PUSCH carrying msg3 may be configured by higher layer parameters.

For cell search and initial access, the channels may include: SS/PBCH block, PDSCH carrying RMSI/RAR/MSG4 scheduled by PDCCH channels carrying DCI, PRACH channels and PUSCH channel carrying MSG3.

Synchronization signal and PBCH block (SS/PBCH block, or SSB in shorter format) comprises the above signals (PSS, SSS and PBCH DMRS), and PBCH. SSB may have 15 kHz, 30 kHz, 120 kHz or 240 kHz SCS depending on the frequency range.

In 3GPP NR standard, downlink control information (DCI) is received over the physical layer downlink control channel (PDCCH). The PDCCH may carry DCI in messages with different formats. DCI format 0_0 and 0_1 are DCI messages used to convey uplink grants to the UE for transmission of the physical layer data channel in the uplink (PUSCH) and DCI format 1_0 and 1_1 are used to convey downlink grants for transmission of the physical layer data channel on the downlink (PDSCH). Other DCI formats (2_0, 2_1, 2_2 and 2_3) are used for other purposes such as transmission of slot format information, reserved resource, transmit power control information etc.

A PDCCH candidate is searched within a common or UE-specific search space which is mapped to a set of time and frequency resources referred to as a control resource set (CORESET). The search spaces within which PDCCH candidates must be monitored are configured to the UE via radio resource control (RRC) signaling. A monitoring periodicity is also configured for different PDCCH candidates. In any particular slot the UE may be configured to monitor multiple PDCCH candidates in multiple search spaces which may be mapped to one or more CORESETs. PDCCH candidates may need to be monitored multiple times in a slot, once every slot or once in multiple of slots.

The smallest unit used for defining CORESETs is a Resource Element Group (REG) which is defined as spanning 1 PRB×1 OFDM symbol in frequency and time. Each REG contains demodulation reference signals (DM-RS) to aid in the estimation of the radio channel over which that REG was transmitted. When transmitting the PDCCH, a precoder could be used to apply weights at the transmit antennas based on some knowledge of the radio channel prior to transmission. It is possible to improve channel estimation performance at the UE by estimating the channel over multiple REGs that are proximate in time and frequency if the precoder used at the transmitter for the REGs is not different. To assist the UE with channel estimation, the multiple REGs can be grouped together to form a REG bundle and the REG bundle size for a CORESET is indicated to the UE. The UE may assume that any precoder used for the transmission of the PDCCH is the same for all the REGs in the REG bundle. A REG bundle may consist of 2, 3 or 6 REGs.

A control channel element (CCE) may include 6 REGs. The REGs within a CCE may either be contiguous or distributed in frequency. When the REGs are distributed in frequency, the CORESET is said to be using an interleaved mapping of REGs to a CCE and if the REGs are not distributed in frequency, a non-interleaved mapping is said to be used.

Interleaving can provide frequency diversity. Not using interleaving is beneficial for cases where knowledge of the channel allows the use of a precoder in a particular part of the spectrum improve the SINR at the receiver.

A PDCCH candidate may span 1, 2, 4, 8 or 16 CCEs. If more than one CCE is used, the information in the first CCE is repeated in the other CCEs. Therefore, the number of aggregated CCEs used is referred to as the aggregation level for the PDCCH candidate.

A hashing function may be used to determine the CCEs corresponding to PDCCH candidates that a UE must monitor within a search space set. The hashing is done differently for different UEs so that the CCEs used by the UEs are randomized and the probability of collisions between multiple UEs for which PDCCH messages are included in a CORESET is reduced.

Figure 2:
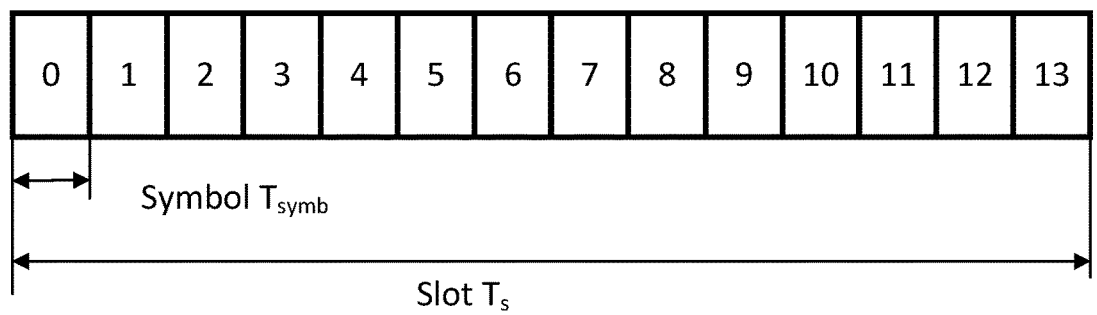
FIG. 2 is a block diagram illustrating a NR slot structure according to some embodiments herein.

Reference is now made to FIG. 2, which is a block diagram illustrating a NR slot structure according to some embodiments herein. An NR slot consists of several OFDM symbols, according to current agreements either 7 or 14 symbols (OFDM subcarrier spacing ≤60 kHz) and 14 symbols (OFDM subcarrier spacing >60 kHz). For example, FIG. 2 shows a subframe with 14 OFDM symbols. In FIG. 2, $T_s$ and $T_{symb}$ denote the slot and OFDM symbol duration, respectively.

Figure 3:
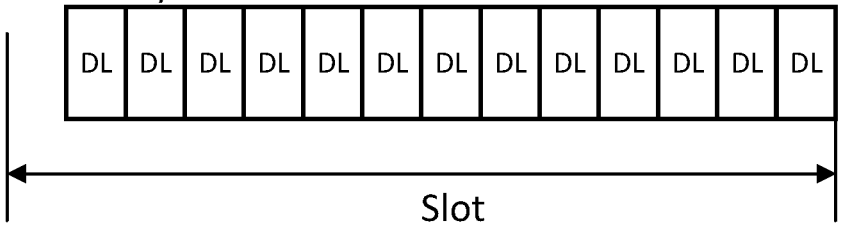
FIG. 3, which is a block diagram illustrating potential variations of an NR slot structure according to some embodiments herein.
Figure 3:
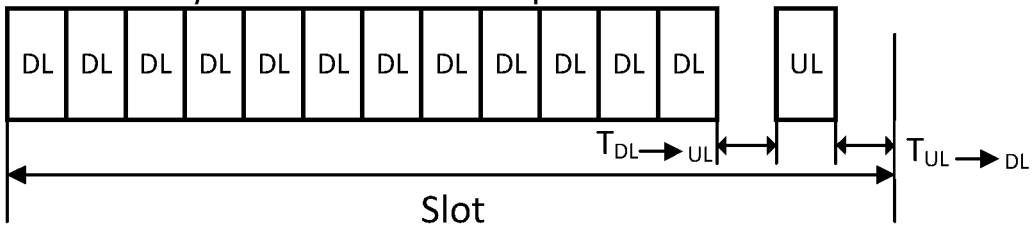
Figure 3:
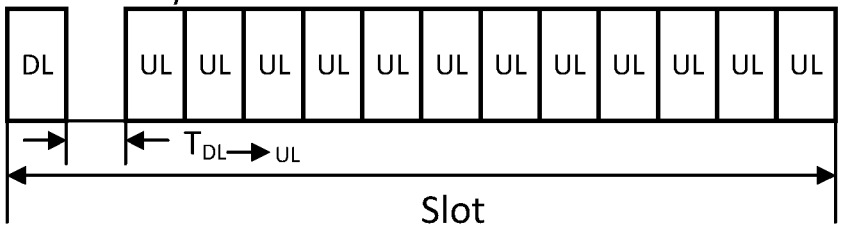
Figure 3:
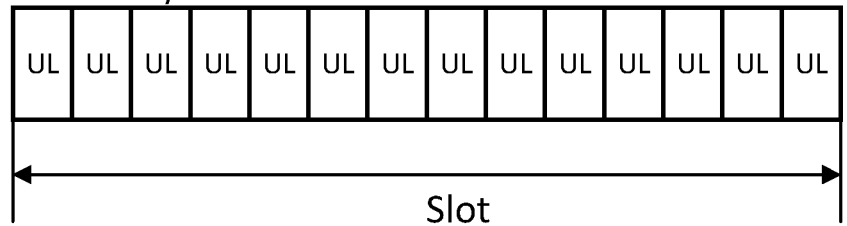

Additionally, a slot may also be shortened to accommodate DL/UL transient period and/or both DL and UL transmissions. For example, brief reference is now made to FIG. 3, which is a block diagram illustrating potential variations of an NR slot structure according to some embodiments herein. As illustrated, variations may include a DL-only transmission with a late start, a DL-heavy transmission with an UL part, an UL-heavy transmission with DL control, and a UL-only transmission.

Figure 4:
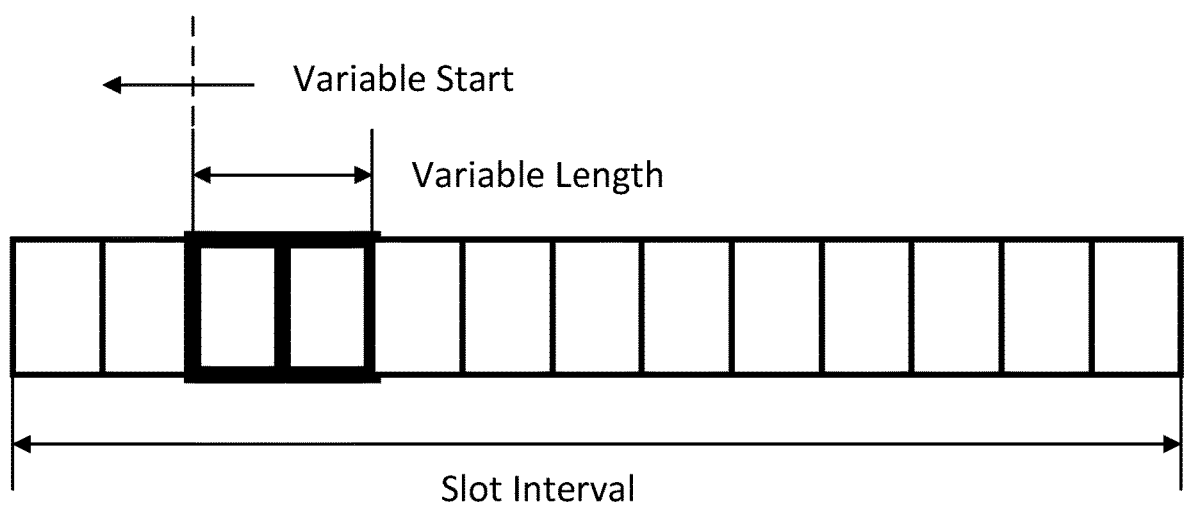
FIG. 4, which is a block diagram of a mini slot with 2 OFDM symbols according to some embodiments herein.

Further, NR also defines Type B scheduling, which may also be referred to as mini-slots. Brief reference is now made to FIG. 4, which is a block diagram of a mini slot with 2 OFDM symbols according to some embodiments herein. Mini-slots may be shorter than slots (according to current agreements from 1 or 2 symbols up to the number of symbols in a slot minus one) and can start at any symbol. Mini-slots may be used if the transmission duration of a slot is too long or the occurrence of the next slot start (slot alignment) is too late. Applications of mini-slots include among others latency critical transmissions (in this case both mini-slot length and frequent opportunity of mini-slot are important) and unlicensed spectrum where a transmission should start immediately after listen-before-talk succeeded (here the frequent opportunity of mini-slot may be especially important).

Currently a multi-segment PUSCH design may be considered. This design according to some embodiments, provides that at least for a scheduled PUSCH, for one UL grant scheduling two or more PUSCH repetitions in consecutive available slots. One repetition may be in each slot with possibly different starting symbols and/or durations, which may be referred to as a "multi-segment transmission". The option may include a time domain resource determination in which the time domain resource assignment field in the DCI indicates the starting symbol and the transmission duration of all the repetitions. FFS multiple SLIVs may indicate the starting symbol and the duration of each repetition. FFS details of SLIV may include the possibility of modifying SLIV to support the cases with S+L>14. The time domain resource determination may further provide FFS the interaction with the procedure of UL/DL direction determination.

For the transmission within one slot, if there are more than one UL period within a slot (where each UL period is the duration of a set of contiguous symbols within a slot for potential UL transmission as determined by the UE), one repetition is within one UL period. FFS if more than one UL period is used for the transmission. If more than one UL period is used, this may override the previous definition of this option and each repetition may occupy contiguous symbols. Otherwise, a single PUSCH repetition is transmitted within a slot following Rel-15 behavior.

For frequency hopping, methods support at least inter-slot FH and FFS includes other FH schemes.

An FFS TBS determination may be made based on the whole duration, or based on the first repetition as an overhead assumption.

In 38.214 v 15.3.0, the transport block size for PDSCH is determined as follows. The transport block size for PUSCH is determined in a similar way, but the modulation order and target code rate are determined from other tables if transform precoding is used.

Modulation Order and Target Code Rate Determination.

For the PDSCH scheduled by a PDCCH with DCI format 1_0 or format 1_1 with CRC scrambled by C-RNTI, MCS-C-RNTI, TC-RNTI, CS-RNTI, SI-RNTI, RA-RNTI, or P-RNTI, or for the PDSCH scheduled without corresponding PDCCH transmissions using the higher-layer-provided PDSCH configuration SPS-config, if the higher layer parameter mcs-Table given by PDSCH-Config is set to 'qam256', and the PDSCH is scheduled by a PDCCH with DCI format 1_1 with CRC scrambled by C-RNTI. Some embodiments provide that the UE shall use IMCS and Table 5.1.3.1-2 to determine the modulation order (Qm) and Target code rate (R) used in the physical downlink shared channel. If the UE is not configured with MCS-C-RNTI, the higher layer parameter mcs-Table given by PDSCH-Config is set to 'qam64LowSE', and the PDSCH is scheduled by a PDCCH in a UE-specific search space with CRC scrambled by C-RNTI. The UE shall use IMCS and Table 5.1.3.1-3 to determine the modulation order (Qm) and Target code rate (R) used in the physical downlink shared channel. If the UE is configured with MCS-C-RNTI, and the PDSCH is scheduled by a PDCCH with CRC scrambled by MCS-C-RNTI, the UE shall use IMCS and Table 5.1.3.1-3 to determine the modulation order (Qm) and Target code rate (R) used in the physical downlink shared channel. If the UE is not configured with the higher layer parameter mcs-Table given by SPS-config, the higher layer parameter mcs-Table given by PDSCH-Config is set to 'qam256'. If the PDSCH is scheduled by a PDCCH with DCI format 1_1 with CRC scrambled by CS-RNTI or if the PDSCH is scheduled without corresponding PDCCH transmission using SPS-config, then the UE shall use IMCS and Table 5.1.3.1-2 to determine the modulation order (Qm) and Target code rate (R) used in the physical downlink shared channel. If the UE is configured with the higher layer parameter mcs-Table given by SPS-config set to 'qam64LowSE and if the PDSCH is scheduled by a PDCCH with CRC scrambled by CS-RNTI or if the PDSCH is scheduled without corresponding PDCCH transmission using SPS-config, then the UE shall use IMCS and Table 5.1.3.1-3 to determine the modulation order (Qm) and Target code rate (R) used in the physical downlink shared channel.

Otherwise, the LUE shall use IMCS and Table 5.1.3.1-1 to determine the modulation order (Qm) and Target code rate (R) used in the physical downlink shared channel. The LUE is not expected to decode a PDSCH scheduled with P-RNTI, RA-RNTI, SI-RNTI and Qm>2

TABLE 5.1.3.1-1

MCS index table 1 for PDSCH

| MCS Index $I_{mcs}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |

TABLE 5.1.3.1-1-continued

MCS index table 1 for PDSCH

| MCS Index $I_{mcs}$ | Modulation Order $Q_m$ | Target code Rate R × [1024] | Spectral efficiency |
|---|---|---|---|
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 5.1.3.1-2

MCS index table 2 for PDSCH

| MCS Index $I_{mcs}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 5.1.3.1-3

MCS index table 3 for PDSCH

| MCS Index $I_{mcs}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Transport Block Size Determination.

In case the higher layer parameter maxNrofCodeWordsScheduledByDCIindicates that two codeword transmission is enabled, then one of the two transport blocks is disabled by DCI format 1_1 if $I_{MCS}=26$ and if $rv_{id}=1$ for the corresponding transport block. If both transport blocks are enabled, transport block 1 and 2 are mapped to codeword 0 and 1 respectively. If only one transport block is enabled, then the enabled transport block is always mapped to the first codeword.

For the PDSCH assigned by a PDCCH with DCI format 1_0 or format 1_1 with CRC scrambled by C-RNTI, MCS-C-RNTI, TC-RNTI, CS-RNTI, or SI-RNTI, if Table 5.1.3.1-2 is used and $0 \leq I_{MCS} \leq 27$, or a table other than Table 5.1.3.1-2 is used and $0 \leq I_{MCS} \leq 28$, the UE shall, except if the transport block is disabled in DCI format 1_1, first determine the TBS as specified below:

The UE shall first determine the number of REs ($N_{RE}$) within the slot. A UE first determines the number of REs allocated for PDSCH within a PRB ($N_{RE}'$) by $N_{RE}'=N_{sc}^{RB} \cdot N_{symb}^{sh} - N_{DMRS}^{PRB} - N_{oh}^{PRB}$, where $N_{sc}^{RB}=12$ is the number of subcarriers in a physical resource block, $N_{symb}^{sh}$ is the number of symbols of the PDSCH allocation within the slot, $N_{DMRS}^{PRB}$ is the number of REs for DM-RS per PRB in the scheduled duration including the overhead of the DM-RS CDM groups without data, as indicated by DCI format 1_1 or as described for format 1_0 in Subclause 5.1.6.2, and $N_{oh}^{PRB}$ is the overhead configured by higher layer parameter xOverhead in PDSCH-ServingCellConfig. If the xOverhead in PDSCH-ServingCellconfig is not configured (a value from 0, 6, 12, or 18), the $N_{oh}^{PRB}$ is set to 0. If the PDSCH is scheduled by PDCCH with a CRC scrambled by SI-RNTI, RA-RNTI or P-RNTI, $N_{oh}^{PRB}$ is assumed to be 0.

A UE determines the total number of REs allocated for PDSCH ($N_{RE}$) by $N_{RE}=\min(156,N_{RE}')\cdot n_{PRB}$, where $n_{PRB}$ is the total number of allocated PRBs for the UE.

Intermediate number of information bits ($N_{info}$) is obtained by $N_{info}=N_{RE}\cdot Q_m\cdot v$.

If $N_{info}\leq 3824$, then use step 3 as the next step of the TBS determination. Otherwise, use step 4 as the next step of the TBS determination. End when $N_{info}\leq 3824$, TBS is determined as follows quantized intermediate number of information bits $$N'_{info} = \max\left(24, 2^n \cdot \left\lfloor \frac{N_{info}}{2^n} \right\rfloor\right),$$

where $n=\max(3,\lfloor \log_2(N_{info}) \rfloor -6)$. Use Table 5.1.3.2-1 find the closest TBS that is not less than $N_{info}'$.

RRC Configuration of TDRA

In NR Rel-15, the Time Domain Resource Allocation (TDRA) information for a PDSCH transmission in a slot includes information such that the UE can determine the slot that the PDSCH is expected to be received (a.k.a. K0), the starting symbol in the slot for PDSCH reception and the length or duration of PDSCH reception (a.k.a. SLIV). The UE is also provided with the mapping type which is used to determine the DMRS positions. In NR, there are TDRA tables specified consisting of different combinations of K0, SLIV, etc. The UE can be signaled an index to a row in the table that provides information on K0 and SLIV to be used for reception.

The similar procedure is applied for PUSCH transmissions where the slot intended for PUSCH transmission is obtained from a field in UL assignment, given by K2. The SLIV information are provided similarly to DL reception as well as the mapping type by UL assignment and/or configuration.

The TDRA are the time domain resource allocation for the first instant of PDSCH reception or PUSCH transmissions. As mentioned previously, if the UE is configured with the aggregation factor, the transmission in that slot, is repeated in multiple slots based on the aggregation factor.

The relevant Information Elements (IEs) from TS 38.331 are listed below to illustrate the usage of these parameters.

PDSCH-TimeDomainResourceAllocationList Information Element

```
-- ASN1 START
-- TAG-PDSCH-TIMEDOMAINRESOURCEALLOCATIONLIST-START
PDSCH-TimeDomainResourceAllocationList ::=   SEQUENCE (SIZE(1..maxNrofDL-
Allocations)) OF PDSCH-TimeDomainResourceAllocation
    PDSCH-TimeDomainResourceAllocation ::=      SEQUENCE {
        k0
    INTEGER(0..32)                                   OPTIONAL, -- Need S
        mappingType
    ENUMERATED {typeA, typeB},
        startSymbolAndLength                          INTEGER (0..127)
    }
-- TAG-PDSCH-TIMEDOMAINRESOURCEALLOCATIONLIST-STOP
-- ASN1STOP
```

PDSCH-TimeDomainResourceAllocation field descriptions k0
The n1 corresponds to the value 1, n2 corresponhds to value 2, and so on.
Corresponds to L1 parameter 'K0' (see 38.214, section FFS_Section) When the field is absent the UE applies the value 0.
  mappingType
  PDSCH mapping type. Corresponds to L1 parameter 'Mapping-type' (see 38.214, section FFS_Section)
  startSymbolAndLength
  An index into a table/equation in RAN1 specs capturing valid combinations of start symbol and length (jointly encoded).
  Corresponds to L1 parameter 'Index-start-len' (see 38.214, section FFS Section)

PUSCH-TimeDomainResourceAllocation Information Element

```
-- ASN1 START
-- TAG-PUSCH-TIMEDOMAINRESOURCEALLOCATIONLIST-START
PUSCH-TimeDomainResourceAllocationList ::=   SEQUENCE (SIZE(1..maxNrofUL-
Allocations)) OF PUSCH-TimeDomainResourceAllocation
    PUSCH-TimeDomainResourceAllocation ::=      SEQUENCE {
        k2
    INTEGER(0..32)                          OPTIONAL, -- Need S
        mappingType
    ENUMERATED {typeA, typeB},
        startSymbolAndLength                          INTEGER (0..127)
    }
-- TAG-PUSCH-TIMEDOMAINRESOURCEALLOCATIONLIST-STOP
-- ASN1STOP
```

| PUSCH-TimeDomainResourceAllocationList field descriptions |
| --- |
| k2 |
| Corresponds to L1 parameter 'K2' (see 38.214, section FFS Section) When the field is absent the UE applies the value 1 when PUSCH SCS is 15/30KHz; 2 when PUSCH SCS is 60KHz and 3 when PUSCH SCS is 120KHz. |
| mappingType |
| Mapping type. Corresponds to L1 parameter 'Mapping-type' (see 38.214, section FFS_Section) |
| startSymbolAndLength |
| An index into a table/equation in RAN1 specs capturing valid combinations of start symbol and length (jointly encoded) Corresponds to L1 parameter 'Index-start-len' (see 38.214, section FFS_Section) |

In addition to the RRC configuration of time domain resource allocation of PDSCH and PUSCH, several default TDRA tables are also defined for PDSCH and PUSCH, respectively. The default tables can be used when PDSCH reception or PUSCH transmission are needed before RRC connections, for example during the initial access.

Currently for eURLLC PUSCH transmission, it is not clear how to configure the transmit format of multi-segment PUSCH.

Some embodiments disclosed herein include methods to indicate the transmit format of multi-segment PUSCH. The transmit format may include the TBS determination, the RV sequence signalling, and signalling of PUSCH starting point and duration.

The solutions are described from a PUSCH perspective, either dynamically scheduled of UL CG (Uplink configured grant), but they apply equally to PDSCH, either dynamically scheduled or DL SPS (downlink semi-persistent scheduling). The embodiments disclosed herein may be written from the perspective of PUSCH segmentation, but they can also be applied to repetition of slots or mini-slots. In this case a segment may be equivalent to a repetition.

TBS Determination

Let $m_0$ be the number of useful symbols occupied by the PUSCH in the first slot. Let $m_1$ be the number of useful symbols occupied by the PUSCH in the second slot. Let $m=\min(13, m_0+m_1)$. Perform TBS determination based on m symbols. Here the symbol refers to an OFDM symbol if OFDM is used for PUSCH transmission, and refers to a DFT-s-OFDM symbol if DFT-s-OFDM is used.

In some embodiments operation 1) in the TBS determination procedure in TS 38.214 section "5.1.3.2 Transport block size determination" is modified by letting $$N'_{RE} = (\Sigma_{i=1}^{N_t} N_{SC}^{RB} \cdot N_{symb,i}^{sh} - N_{DMRS,i}^{PRB}) - N_{oh}^{PRB}$$

where $N_{symb,i}^{sh}$ is the number of symbols of the PUSCH allocation in the slot i, and $N_{DMRS}^{PRB}$ is the number of Res for DM-RS per PRB in the scheduled duration including the overhead of the RS CDM groups without data for slot I, and the sum is over all slots in the transmission.

In some embodiments, operation 1) in the TBS determination procedure in TS 38.214 section "5.1.3.2 Transport block size determination" is modified by letting $$N'_{RE} = (\Sigma_{i=1}^{N_t} N_{SC}^{RB} \cdot N_{symb,i}^{sh} - N_{DMRS,i}^{PRB} - N_{oh}^{PRB})$$

where $N_{symb,i}^{sh}$ is the number of symbols of the PUSCH allocation in the slot i, and $N_{DMRS,i}^{PRB}$ is the number of Res for DM-RS per PRB in the scheduled duration including the overhead of the RS CDM groups without data for slot i, and the sum is over all slots in the transmission.

In some embodiments operation 1) in the TBS determination procedure in TS 38.214 section "5.1.3.2 Transport block size determination" is modified by letting $$N'_{RE} = \left(\sum_{i=1}^{N_t} N_{SC}^{RB} \cdot N_{symb,i}^{sh} - N_{DMRS,i}^{PRB}\right) - N_{oh}^{PRB}$$

where $N_{symb,i}^{sh}$ is the number of symbols of the PUSCH allocation in the segment (or repetition) i, and $N_{DMRS,i}^{PRB}$ is the number of Res for DM-RS per PRB in the scheduled duration including the overhead of the RS CDM groups without data for segment (or repetition) i, and the sum is over all segments (or repetitions) in the transmission.

In some embodiments operation 1) in the TBS determination procedure in TS 38.214 section "5.1.3.2 Transport block size determination" is modified by letting $$N'_{RE} = \left(\sum_{i=1}^{N_t} N_{SC}^{RB} \cdot N_{symb,i}^{sh} - N_{DMRS,i}^{PRB} - N_{oh}^{PRB}\right)$$

where $N_{symb,i}^{sh}$ is the number of symbols of the PUSCH allocation in the segment (or repetition) i, and $N_{DMRS,i}^{PRB}$ is the number of Res for DM-RS per PRB in the scheduled duration including the overhead of the RS CDM groups without data for segment (or repetition) i, and the sum is over all segments (or repetitions) in the transmission.

RV Determination

For dynamically scheduled multi-segment PUSCH, the RV field in uplink grant DCI provides the initial RV for the initial PUSCH segment. For subsequent PUSCH segments, the RV may be cyclically taken from the RV sequence {0,2,3,1}.

In another embodiment, each segment has an RV that is signaled individually.

In some embodiments, multi-segment PUSCH associated with UL CG, the RV sequence {0,2,3,1} should be used instead of being configured by RRC.

For Type 1 UL CG configuration, RRC signal provides the initial RV for the initial PUSCH segment.

For Type 2 UL CG configuration, the RV field in the activation DCI provides the initial RV for the initial PUSCH segment.

In some embodiments multiple possible CG PUSCH allocations can be configured with a single RRC configuration or activation DCI. One example of this is if the periodicity of the grant is smaller than the total length of the grant, including any repetitions or segmenting. For example, assume that the configuration allows for the following transmission opportunities for PUSCH CG starting in slot n.

| Opportunity | number of segments | start symbol and length of segment 1 in slot n | start symbol and length of segment 2 in slot n + 1 |
|---|---|---|---|
| 1 | 1 | 0, 8 | |
| 3 | 1 | 2, 8 | |
| 2 | 1 | 4, 8 | |
| 3 | 1 | 6, 8 | |
| 4 | 2 | 8, 6 | 0, 2 |
| 5 | 2 | 10, 4 | 0, 4 |
| 6 | 2 | 12, 2, | 0, 6 |

It may be advantageous to use redundancy version (RV) 0 for the segment with the longest length in each transmission.

Let RV_init be the RV signaled in RRC or in activation DCI as an initial RV. In some embodiments RV_init is not signaled but is fixed to a single value, e.g. 0.

In some embodiments, to allocate RVs to the different segments for different transmission opportunities the following procedure is followed. First the segment with longest length (as counted in OFDM symbols or DFT-S-OFDM symbols) is found. If there is more than one segment with the longest length, then one of them is chosen by a predefined rule. E.g. the first segment is chosen. For the chosen segment RV_init is used. The other segments in the transmission opportunity use RV given by a sequence. If segment k uses the 1:th RV in the sequence, then segment k−1 uses the l−1:th RV in the sequence, segment k+1 uses the l+1:th in the sequence etc. The sequence is used in a cyclic manner, so if a segment uses the last RV in the sequence, then the next sequence will use the first RV in the sequence. In the same way, if a segment uses the first RV in the sequence, the previous segment will use the last segment in the sequence.

In one set of embodiments the RV sequence used is (0, 2, 3, 1).

As an example of the previous embodiment let the initial RV be 0, let ties between segments of equal length be broken by choosing the first of these segments and use the sequence (0, 2, 3, 1). Then the different segments of the different transmission opportunities in the example in the table above will be given as follows:

| Opportunity | number of segments | start symbol and length of segment 1 in slot n | RV for segment 1 as calculated by the embodiment | start symbol and length of segment 2 in slot n + 1 | RV for segment 2 as calculated by the embodiment |
|---|---|---|---|---|---|
| 1 | 1 | 0, 8 | 0 | No segment 2 | |
| 3 | 1 | 2, 8 | 0 | No segment 2 | |
| 2 | 1 | 4, 8 | 0 | No segment 2 | |
| 3 | 1 | 6, 8 | 0 | No segment 2 | |
| 4 | 2 | 8, 6 | 0 | 0, 2 | 2 |
| 5 | 2 | 10, 4 | 0 | 0, 4 | 2 |
| 6 | 2 | 12, 2, | 1 | 0, 6 | 0 |

For opportunity 4-6 there are two segments. For opportunity 4, segment 1 is the longest and uses RV 0, then segment 2 uses RV 2, the next RV in the sequence. Opportunity 5 is similar and the two segments have equal length, but segment 1 is chosen by a tie-breaker rule. Then segment 2 uses RV 2. For opportunity 6 segment 2 is longest and uses RV 0. Segment 1 then uses the RV preceeding RV 0 in the sequence, which is RV 1, wrapping around cyclically in the sequence.

The same embodiment as given above could be used for opportunities that use more than two segments.

In some embodiments there is only a single segment per slot.

In some embodiments there is more than one segment per slot.

Dynamically Scheduled Multi-Segment PUSCH

DCI provides starting point S (unit: symbol) and length L of PUSCH transmission, where S and L both use unit symbol (OS).

In some embodiments, more than one PUSCH segment is used if any of the symbols between the start of the transmission (as given by symbol S) and the end of the transmission (as calculated from the starting point S and the length L) are not allowed to be used for uplink transmission, or if any of the symbols are in different slots.

Each segment contains a set of consecutive symbols used for UL transmission where all the symbols in the segment are in the same slot.

In some embodiments, the segments are chosen to be as large as possible, i.e. if two consecutive symbols in the allocation are in the same slot and both are allowed for UL transmission they belong to the same segment. In some embodiments, the number and length of PUSCH segments used are determined based on S, L, which symbols are used for UL transmission, and which symbols are in which slots.

As an example, see the following table where S=0 and L=28.

| Symbol | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| Slot | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 |
| UL transmission allowed? | Y | Y | Y | Y | N | N | N | N | Y | Y | Y | Y | Y | Y | Y | Y | Y | Y | N | N | N | N | Y | Y | Y | Y | Y | Y |
| PUSCH segment | 1 | 1 | 1 | 1 | | | | | 2 | 2 | 2 | 2 | 2 | 2 | 3 | 3 | 3 | 3 | | | | | 4 | 4 | 4 | 4 | 4 | 4 |

In some embodiments an SFI (slot format indicator) DCI message is used to determine which symbols are used for UL transmission.

In some embodiments RRC signaling is used to determine which symbols are used for UL transmission.

In some embodiments, symbols used for transmission of SRS are not allowed to be used for UL transmission.

In some embodiments, a set of consecutive symbols in the same slot where UL transmission is allowed may not be allocated to a segment if the resulting segment is shorter than a certain number of symbols. For example, if the resulting segment would be only one symbol long this will not be allocated to its own segment.

Multi-Segment PUSCH Associated with UL CG

For Type 1 UL CG configuration, (S, L) is provided by RRC configuration timeDomainAllocation.

For Type 2 UL CG configuration, (S, L) is provided by activation DCI.

For PUSCH scheduled by CG the same rules for determining the segments can be used as for dynamically scheduled PUSCH.

Scheduling Through Entries in TDRA Table

In some embodiments, a row in the TDRA table can be associated with multiple combinations of (S, L, and K2) values. If such a row is indicated then each combination would indicate one PUSCH segment.

| Row index | PUSCH mapping type | $K_{2,1}$ | $S_1$ | $L_1$ | $K_{2,2}$ | $S_2$ | $L_2$ |
|---|---|---|---|---|---|---|---|
| i | Type B | J | 12 | 2 | j + 1 | 0 | 2 |

In the example above, if the given row is used, it corresponds to two segments, one in slot j with start symbol 12 of length 2, and one in slot j+1 with start symbol 0 and length 2. The row index can be signaled dynamically through DCI, in an activation DCI of a CG or configured through RRC.

If the same method is used to signal PDSCH segments, then K2 may be replaced by $K_0$.

DMRS for Multi-Segment PUSCH

In some embodiments, each segment contains DMRS.

In some embodiments, only the first segment in a slot contains DMRS.

In some embodiments, only the first segment in the transmission, and the first segment after some symbols which are not allowed for UL transmission use DMRS.

In some embodiments, the first segment in a slot does not contain DMRS if the previous slot contained a segment in the last symbol.

If a segment contains DMRS, the number of symbols used for DMRS and which symbols in the segment to use for DMRS are inherited from the DMRS allocation signaled or configured for the transmission, i.e. each segment that contains DMRS is treated as a separate PUSCH when determining the DMRS sequence and allocation, and the rel. 15 rules for placing DMRS are used for this segment.

Figure 5:
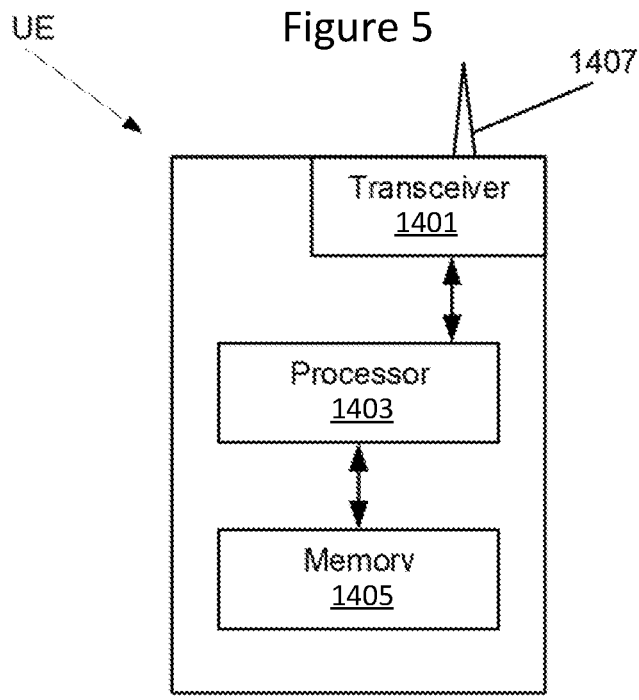
FIG. 5 is a block diagram illustrating a wireless device according to some embodiments of inventive concepts.

FIG. 5 is a block diagram illustrating elements of a wireless device UE (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 1407, and a transceiver circuit 1401 (also referred to as a transceiver) including a transmitter and a receiver configured to provide uplink and downlink radio communications with a base station eNB of a wireless communication network (also referred to as a radio access network RAN). Wireless device UE may also include a processor circuit 1403 (also referred to as a processor) coupled to the transceiver circuit, and a memory circuit 1405 (also referred to as memory) coupled to the processor circuit. The memory circuit 1405 may include computer readable program code that when executed by the processor circuit 1403 causes the processor circuit to perform operations according to embodiments disclosed herein. According to other embodiments, processor circuit 1403 may be defined to include memory so that a separate memory circuit is not required. Wireless device UE may also include an interface (such as a user interface) coupled with processor 1403, and/or wireless device UE may be an IoT and/or MTC device.

As discussed herein, operations of wireless device UE may be performed by processor 1403 and/or transceiver 1401. For example, processor 1403 may control transceiver 1401 to transmit uplink communications through transceiver 1401 over a radio interface to a base station eNB of a wireless communication network and/or to receive downlink communications through transceiver 1401 from a base station eNB of the wireless communication network over a radio interface. Moreover, modules may be stored in memory 1405, and these modules may provide instructions so that when instructions of a module are executed by processor 1403, processor 1403 performs respective operations (e.g., operations discussed below with respect to Example Embodiments).

Figure 6:
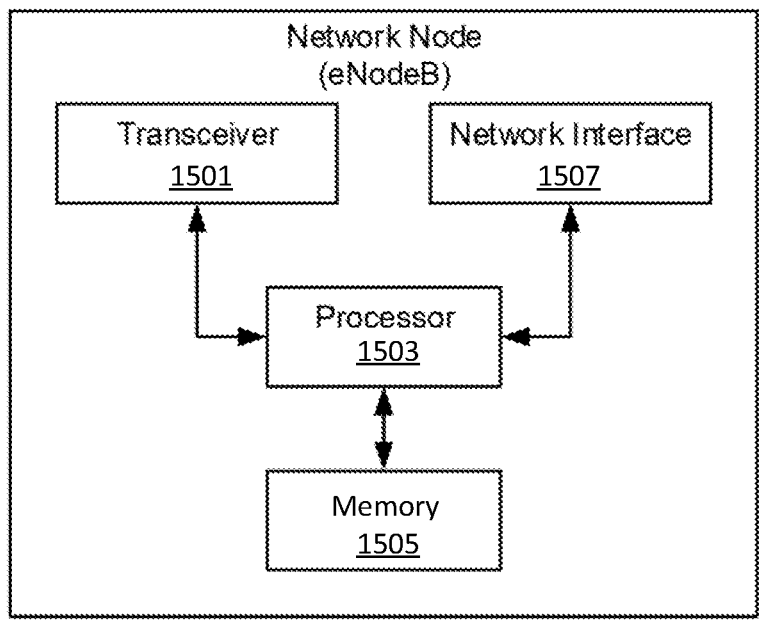
FIG. 6 is a block diagram illustrating a network node eNB according to some embodiments of inventive concepts.

FIG. 6 is a block diagram illustrating elements of a node (also referred to as a network node, base station, eNB, eNodeB, etc.) of a wireless communication network (also referred to as a Radio Access Network RAN) configured to provide cellular communication according to embodiments of inventive concepts. As shown, the network node may include a transceiver circuit 1501 (also referred to as a transceiver) including a transmitter and a receiver configured to provide uplink and downlink radio communications with wireless devices. The network node may include a network interface circuit 1507 (also referred to as a network interface) configured to provide communications with other nodes (e.g., with other base stations and/or core network nodes) of the RAN. The network node may also include a processor circuit 1503 (also referred to as a processor) coupled to the transceiver circuit, and a memory circuit 1505 (also referred to as memory) coupled to the processor circuit. The memory circuit 1505 may include computer readable program code that when executed by the processor circuit 1503 causes the processor circuit to perform operations according to embodiments disclosed herein. According to other embodiments, processor circuit 1503 may be defined to include memory so that a separate memory circuit is not required.

As discussed herein, operations of the network node may be performed by processor 1503, network interface 1507, and/or transceiver 1501. For example, processor 1503 may control transceiver 1501 to transmit downlink communications through transceiver 1501 over a radio interface to one or more UEs and/or to receive uplink communications through transceiver 1501 from one or more UEs over a radio interface. Similarly, processor 1503 may control network interface 1507 to transmit communications through network interface 1507 to one or more other network nodes and/or to receive communications through network interface from one or more other network nodes. Moreover, modules may be stored in memory 1505, and these modules may provide instructions so that when instructions of a module are executed by processor 1503, processor 1503 performs respective operations (e.g., operations discussed below with respect to Example Embodiments).

Figure 7:
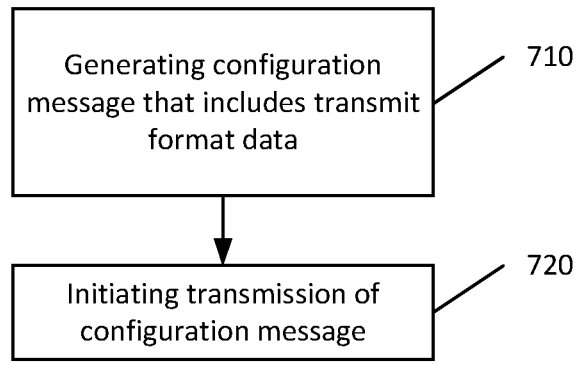
FIG. 7 which is a block diagram illustrating operations according to some embodiments of inventive concepts.

Reference is now made to FIG. 7, which is a block diagram illustrating operations according to some embodiments of inventive concepts. Operations may include generating a configuration message that comprises transmit format data corresponding to a multiple segment transmission on a physical shared channel (block 710). In some embodiments, the transmit format data includes at least one of transport block size data, TBS, determination data, redundancy version, RV, determination data, starting point and length of PUSCH transmission data, time domain resource allocation, TDRA, table data, and/or demodulated reference signal, DMRS data.

In some embodiments, a network device may perform an operation of determining that a transmission needs to be split into multiple segments. Some embodiments provide that determining that the transmission needs to be split may be performed before a multi-segment transmission configuration is sent to a wireless device. In such embodiments, generating the configuration message may be based on such determination. Some embodiments provide that the network device includes a processor and a memory that stores instructions that, when executed, cause the processor circuit to determine that the transmission needs to be split.

Operations further include initiating the transmission of the configuration message to a user equipment, UE, to identify the transmit format data for the multiple segment transmission (block 720).

Figure 8:
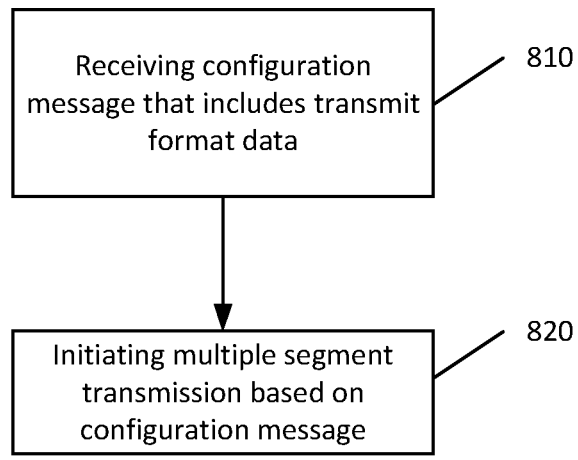
FIG. 8 which is a block diagram illustrating operations according to some embodiments of inventive concepts.

Reference is now made to FIG. 8, which is a block diagram illustrating operations according to some embodiments of inventive concepts. Operations include receiving a configuration message that comprises transmit format data corresponding to a multiple segment transmission on a physical shared channel (block 810). In some embodiments, the transmit format data includes at least one of transport block size data, TBS, determination data, redundancy version, RV, determination data, starting point and length of PUSCH transmission data, time domain resource allocation, TDRA, table data, and/or demodulated reference signal, DMRS data. Operations include initiating the multiple segment transmission on the physical shared channel based on the configuration message (block 820).

Example embodiments of inventive concepts are set forth below:

Embodiment 1. A method of operating a network node in a wireless
  telecommunication network, the method comprising:
  generating a configuration message that comprises transmit format data corresponding to a multiple segment transmission on a physical shared channel, the transmit format data comprising at least one of transport block size data, TBS, determination data, redundancy version, RV, determination data, starting point and length of PUSCH transmission data, time domain resource allocation, TDRA, table data, and/or demodulated reference signal, DMRS data; and
  initiating the transmission of the configuration message to a user equipment, UE, to identify the transmit format data for the multiple segment transmission.

Embodiment 2. The method of embodiment 1, wherein the physical shared channel comprises a physical uplink shared channel, PUSCH.

Embodiment 3. The method of embodiment 1, wherein the multiple segment physical shared channel comprises physical downlink shared channel, PDSCH.

Embodiment 4. The method of any of embodiments 1-3, wherein the TBS determination data is determined by $N'_{RE}=(\sum_{i=1}^{N_j} N_{SC}^{RB} \cdot N_{symb,i}^{sh} - N_{DMRS,i}^{PRB}) - N_{oh}^{PRB}$ where $N_{symb,i}^{sh}$ is a number of symbols of the PUSCH allocation in slot i, and $N_{DMRS,i}^{PRB}$ is a number of Res for DM-RS per physical resource block, PRB, in the scheduled duration including an overhead of RS CDM groups without data for slot I, and a sum is over all slots in the multiple segment transmission.

Embodiment 5. The method of any of embodiments 1-4, wherein the TBS determination data is determined by $N'_{RE}=(\sum_{i=1}^{N_j} N_{SC}^{RB} \cdot N_{symb,i}^{sh} - N_{DMRS,i}^{PRB} - N_{oh}^{PRB})$ where $N_{symb,i}^{sh}$ is a number of symbols of a PUSCH allocation in slot i, and $N_{DMRS,i}^{PRB}$ is a number of Res for DM-RS per PRB in the scheduled duration including the overhead of the RS CDM groups without data for slot i, and a sum is over all slots in the multiple segment transmission.

Embodiment 6. The method of any of embodiments 1-5, wherein the TBS determination data is determined by $N'_{RE}=(\sum_{i=1}^{N_j} N_{SC}^{RB} \cdot N_{symb,i}^{sh} - N_{DMRS,i}^{PRB}) - N_{oh}^{PRB}$ where $N_{symb,i}^{sh}$ is a number of symbols of a PUSCH allocation in a segment or repetition i, and $N_{DMRS,i}^{PRB}$ is a number of Res for DM-RS per PRB in a scheduled duration including an overhead of RS CDM groups without data for segment or repetition i, and a sum is over all segments or repetitions in the multiple segment transmission.

Embodiment 7. The method of any of embodiments 1-6, wherein the TBS determination data is determined by $N'_{RE}=(\sum_{i=1}^{N_j} N_{SC}^{RB} \cdot N_{symb,i}^{sh} - N_{DMRS,i}^{PRB} - N_{oh}^{PRB})$ where $N_{symb,i}^{sh}$ is a number of symbols of a PUSCH allocation in a segment or repetition i, and $N_{DMRS,i}^{PRB}$ is a number of Res for DM-RS per PRB in a scheduled duration including an overhead of the RS CDM groups without data for segment or repetition i, and a sum is over all segments or repetitions in the multiple segment transmission.

Embodiment 8. The method of any of embodiments 1-7, wherein the RV determination data is determined by an initial RV for an initial PUSCH segment and a next RV in an RV sequence.

Embodiment 9. The method of embodiment 8, wherein a radio resource control, RRC, signal provides the initial RV for the initial PUSCH segment.

Embodiment 10. The method of any of embodiments 8-9, wherein an RV field in an activation downlink control indicator, DCI, provides the initial RV for the initial PUSCH segment.

Embodiment 11. The method of any of embodiments 8-10, wherein RVs are allocated to different segments for different transmission opportunities, wherein a segment with longest length is found, and wherein other segments in a transmission opportunity use the RV determined by the RV sequence.

Embodiment 12. The method of any of embodiments 8-11, wherein the RV sequence is used cyclically.

Embodiment 13. The method of any of embodiments 1-12, wherein an SFI, slot format indicator, DCI message is used to determine which symbols are used for UL transmission.

Embodiment 14. The method of any of embodiments 1-13, wherein RRC signaling is used to determine which symbols are used for UL transmission.

Embodiment 15. The method of any of embodiments 1-14, wherein symbols used for transmission of SRS are not used for UL transmission.

Embodiment 16. The method of any of embodiments 1-15, wherein a set of consecutive symbols in a same slot where a UL transmission is allowed is not allocated to a segment if a resulting segment is shorter than a given number of symbols.

Embodiment 17. The method of any of embodiments 1-16, wherein a DCI provides a starting point S and a length L of a PUSCH transmission.

Embodiment 18. The method of any of embodiments 1-17, wherein each segment contains a set of consecutive symbols used for UL transmission, and wherein all symbols in the segment are in the same slot.

Embodiment 19. The method of any of embodiments 1-18, wherein the number and length of PUSCH segments used are determined based on a starting point and length to determine which symbols are used for UL transmission.

Embodiment 20. The method of any of embodiments 1-19, wherein a row in the TDRA table is associated with multiple combinations of start symbol identifier and a symbol length value.

Embodiment 21. The method of any of embodiments 1-20, wherein each segment includes a demodulation reference signal, DMRS.

Embodiment 22. The method of any of embodiments 1-20, wherein only a first segment in a slot includes a demodulation reference signal, DMRS.

Embodiment 23. The method of embodiment 21, wherein only a first segment in a transmission, and a first segment after a disallowed symbol includes DMRS.

Embodiment 24. The method of embodiment 21, wherein a first segment in a slot does not contain DMRS responsive to the previous slot including a segment in the last symbol.

Embodiment 25. A base station (gNB) of a wireless communication network, the base station comprising:
- a transceiver (1501) configured to provide wireless network communication with a wireless terminal; and
- a processor (1503) coupled with the transceiver, wherein the processor is configured to provide wireless network communications through the transceiver, and wherein the processor is configured to perform operations according to any of Embodiments 1-24.

Embodiment 26. A base station (eNB) of a radio access network, wherein the base station is adapted to perform according to any of Embodiments 1-24.

Embodiment 27. A method of operating a network node that is configured to provide link adaptation and/or resource reselection based on feedback information from a receiver user equipment, UE, the method adapted to perform operations according to any of Embodiments 1-24.

Embodiment 28. A method of operating a wireless device in a wireless telecommunication network, the method comprising:
- receiving a configuration message that comprises transmit format data corresponding to a multiple segment transmission on a physical shared channel, the transmit format data comprising at least one of transport block size data, TBS, determination data, redundancy version, RV, determination data, starting point and length of PUSCH transmission data, time domain resource allocation, TDRA, table data, and/or demodulated reference signal, DMRS data; and
- initiating the multiple segment transmission on the physical shared channel based on the configuration message.

Embodiment 29. The method of embodiment 28, wherein the physical shared channel comprises a physical uplink shared channel, PUSCH.

Embodiment 30. The method of embodiment 28, wherein the multiple segment physical shared channel comprises physical downlink shared channel, PDSCH.

Embodiment 31. The method of any of embodiments 28-30, wherein the TBS determination data is determined by $N'_{RE}=(\Sigma_{i=1}^{N_l} N_{SC}^{RB} \cdot N_{symb,i}^{sh} - N_{DMRS,i}^{PRB}) - N_{oh}^{PRB}$ where $N_{symb,i}^{sh}$ is a number of symbols of the PUSCH allocation in slot i, and $N_{DMRS,i}^{PRB}$ is a number of Res for DM-RS per physical resource block, PRB, in the scheduled duration including an overhead of RS CDM groups without data for slot I, and a sum is over all slots in the multiple segment transmission.

Embodiment 32. The method of any of embodiments 28-31, wherein the TBS determination data is determined by $N'_{RE}=(\Sigma_{i=1}^{N_l} N_{SC}^{RB} \cdot N_{symb,i}^{sh} - N_{DMRS,i}^{PRB} - N_{oh}^{PRB})$
where $N_{symb,i}^{sh}$ is a number of symbols of a PUSCH allocation in slot i, and $N_{DMRS,i}^{PRB}$ is a number of Res for DM-RS per PRB in the scheduled duration including the overhead of the RS CDM groups without data for slot i, and a sum is over all slots in the multiple segment transmission.

Embodiment 33. The method of any of embodiments 28-32, wherein the TBS determination data is determined by $N'_{RE}=(\Sigma_{i=1}^{N_l} N_{SC}^{RB} \cdot N_{symb,i}^{sh} - N_{DMRS,i}^{PRB}) - N_{oh}^{PRB}$
where $N_{symb,i}^{sh}$ is a number of symbols of a PUSCH allocation in a segment or repetition i, and $N_{DMRS,i}^{PRB}$ is a number of Res for DM-RS per PRB in a scheduled duration including an overhead of RS CDM groups without data for segment or repetition i, and a sum is over all segments or repetitions in the multiple segment transmission.

Embodiment 34. The method of any of embodiments 28-33, wherein the TBS determination data is determined by $N'_{RE}=(\Sigma_{i=1}^{N_l} N_{SC}^{RB} \cdot N_{symb,i}^{sh} - N_{DMRS,i}^{PRB} - N_{oh}^{PRB})$
where $N_{symb,i}^{sh}$ is a number of symbols of a PUSCH allocation in a segment or repetition i, and $N_{DMRS,i}^{PRB}$ is a number of Res for DM-RS per PRB in a scheduled duration including an overhead of the RS CDM groups without data for segment or repetition i, and a sum is over all segments or repetitions in the multiple segment transmission.

Embodiment 35. The method of any of embodiments 28-34, wherein the RV determination data is determined by an initial RV for an initial PUSCH segment and a next RV in an RV sequence.

Embodiment 36. The method of embodiment 35, wherein a radio resource control, RRC, signal provides the initial RV for the initial PUSCH segment.

Embodiment 37. The method of any of embodiments 35-36, wherein an RV field in an activation downlink control indicator, DCI, provides the initial RV for the initial PUSCH segment.

Embodiment 38. The method of any of embodiments 35-37, wherein RVs are allocated to different segments for different transmission opportunities, wherein a segment with longest length is found, and wherein other segments in a transmission opportunity use the RV determined by the RV sequence.

Embodiment 39. The method of any of embodiments 35-38, wherein the RV sequence is used cyclically.

Embodiment 40. The method of any of embodiments 28-37, wherein an SFI, slot format indicator, DCI message is used to determine which symbols are used for UL transmission.

Embodiment 41. The method of any of embodiments 28-40, wherein RRC signaling is used to determine which symbols are used for UL transmission.

Embodiment 42. The method of any of embodiments 28-41, wherein symbols used for transmission of SRS are not used for UL transmission.

Embodiment 43. The method of any of embodiments 28-42, wherein a set of consecutive symbols in a same slot where a UL transmission is allowed is not allocated to a segment if a resulting segment is shorter than a given number of symbols.

Embodiment 44. The method of any of embodiments 28-43, wherein a DCI provides a starting point S and a length L of a PUSCH transmission.

Embodiment 45. The method of any of embodiments 28-44, wherein each segment contains a set of consecutive symbols used for UL transmission, and wherein all symbols in the segment are in the same slot.

Embodiment 46. The method of any of embodiments 28-45, wherein the number and length of PUSCH segments used are determined based on a starting point and length to determine which symbols are used for UL transmission.

Embodiment 47. The method of any of embodiments 28-46, wherein a row in the TDRA table is associated with multiple combinations of start symbol identifier and a symbol length value.

Embodiment 48. The method of any of embodiments 28-47, wherein each segment includes a demodulation reference signal, DMRS.

Embodiment 49. The method of any of embodiments 28-48, wherein only a first segment in a slot includes a demodulation reference signal, DMRS.

Embodiment 50. The method of embodiment 48, wherein only a first segment in a transmission, and a first segment after a disallowed symbol includes DMRS.

Embodiment 51. The method of embodiment 48, wherein a first segment in a slot does not contain DMRS responsive to the previous slot including a segment in the last symbol.

Embodiment 52. A first wireless device (UE) comprising:
a transceiver (1401) configured to provide wireless network communication with a wireless communication network; and
a processor (1403) coupled with the transceiver, wherein the processor is configured to provide wireless network communication through the transceiver, and wherein the processor is configured to perform operations according to any of Embodiments 28-51.

Explanations for abbreviations from the above disclosure are provided below.

| Abbreviation | Explanation |
| --- | --- |
| SL | Sidelink |
| Tx | Transmitter |
| Rx | Receiver |
| BSM | Basic Safety Message |
| BW | Bandwidth |
| BSR | Buffer Status Report |
| CAM | Cooperative Awareness Message |
| CBR | Channel Busy Ratio |
| DPTF | Data Packet Transmission Format |
| D2D | Device-to-Device Communication |
| DENM | Decentralized Environmental Notification Message |
| DSRC | Dedicated Short-Range Communications |
| eNB | eNodeB |
| ETSI | European Telecommunications Standards Institute |
| LTE | Long-Term Evolution |
| NW | Network |
| RS | Reference Signals |
| TF | Transport Format |
| SAE | Society of the Automotive Engineers |
| UE | User Equipment |

-continued

| Abbreviation | Explanation |
| --- | --- |
| V2I | Vehicle-to-Infrastructure |
| V2P | Vehicle-to-Pedestrian |
| V2V | Vehicle-to-(vehicle) communication |
| V2X | Vehicle-to-anything-you-can-imagine |
| MAC | Medium Access Control |
| PDU | Packet Data Unit |
| 3GPP | Third Generation Partnership Project |
| 5G | Fifth Generation |
| RRC | Radio Resource Control |
| ProSe | Proximity Services |
| PRB | Physical Resource Block |
| ME | Mobile Equipment |
| ID | Identifier |
| PDB | Packet Delay Budget |
| CBR | Congestion Busy Ratio |
| SDU | Service Data Unit |
| PDU | Protocol Data Unit |
| BLER | Block Error Rate |
| MCS | Modulation Coding Scheme |
| TBS | Transport Block Size |
| MIMO | Multiple Input Multiple Output |
| PSCCH | Physical Sidelink Control Channel |
| ITS | Intelligent Transport System |
| PPPP | Prose Per Packet Priority |
| QoS | Quality of Service |
| QCI | QoS Class Identifier |
| 5QI | 5G QoS Indicator |
| ACK/NACK | Acknowledgment/Non-acknowledgment |
| CG | Configured Grant |
| DCI | Downlink Control Information |
| DFTS-OFDM | Discrete Fourier Transform Spread OFDM |
| DL | Downlink |
| DMRS | Demodulation Reference Signal |
| GF | Grant-Free |
| gNB | Next Generation NodeB |
| LTE | Long-Term Evolution |
| MCS | Modulation and Coding Scheme |
| NR | New Radio |
| PUCCH | Physical Uplink Control Channel |
| PUSCH | Physical Uplink Shared Channel |
| SNR | Signal-to-Noise Ratio |
| SPS | Semi-Persistent Scheduling |
| SUL | Supplemental Uplink |
| TTI | Transmission Time Interval |
| TO | Transmission Occasion |
| UL | Uplink |
| URLLC | Ultra-Reliable and Low-Latency Communications |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 9:
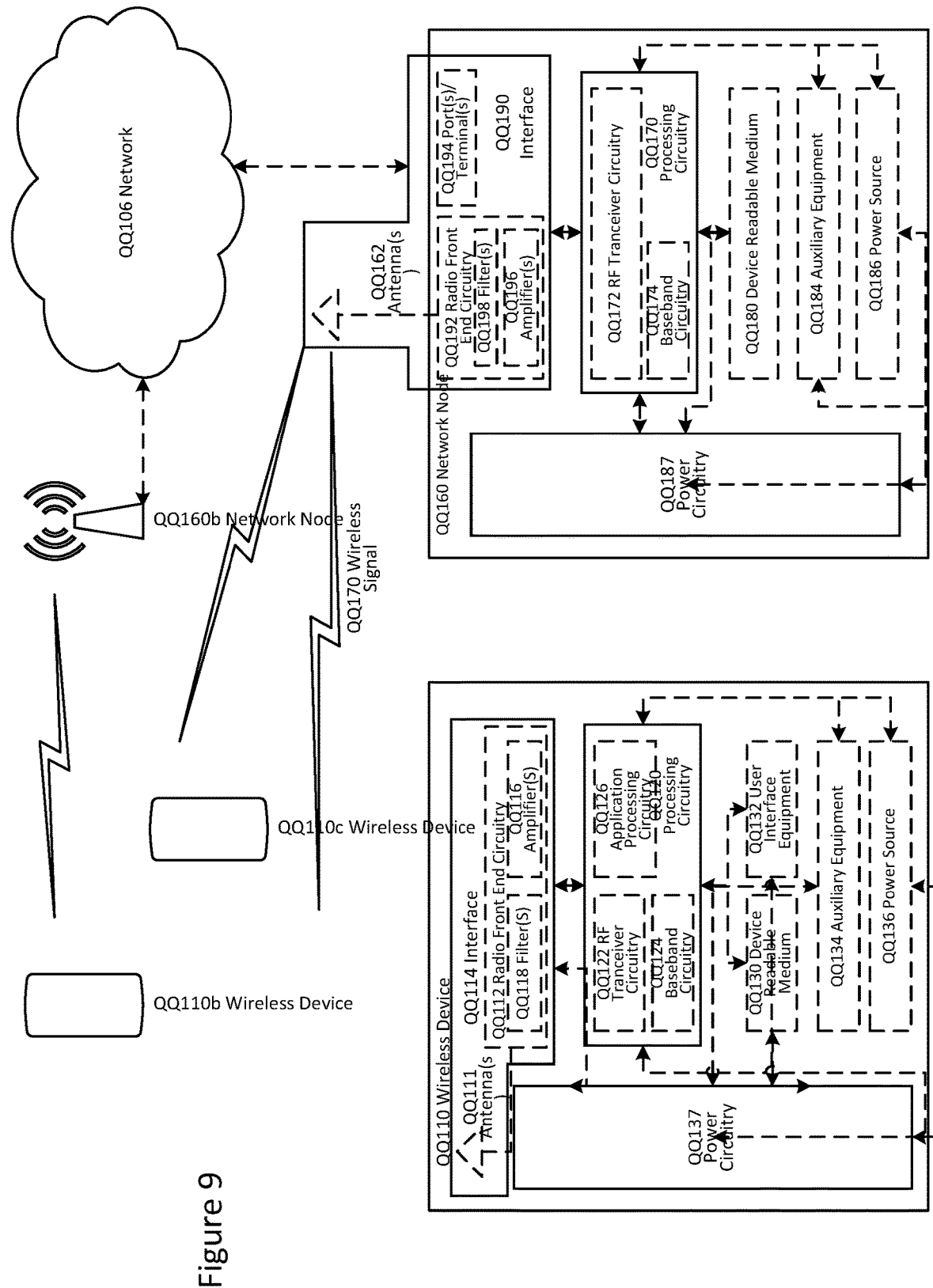
FIG. 9 is a block diagram of a wireless network in accordance with some embodiments.

FIG. 9: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 9 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 10:
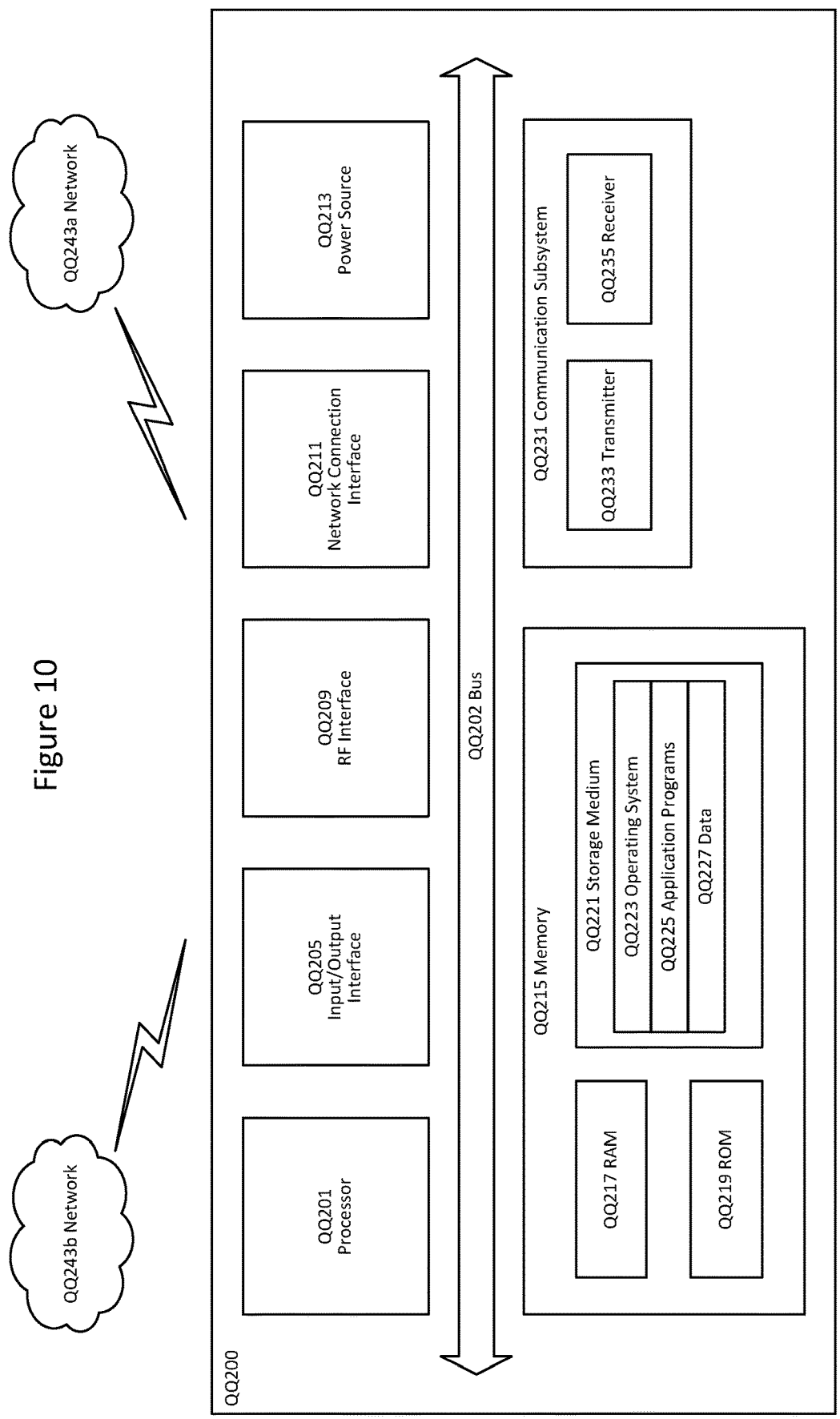
FIG. 10 is a block diagram of a user equipment in accordance with some embodiments

FIG. 10: User Equipment in Accordance with Some Embodiments

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 10, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 11:
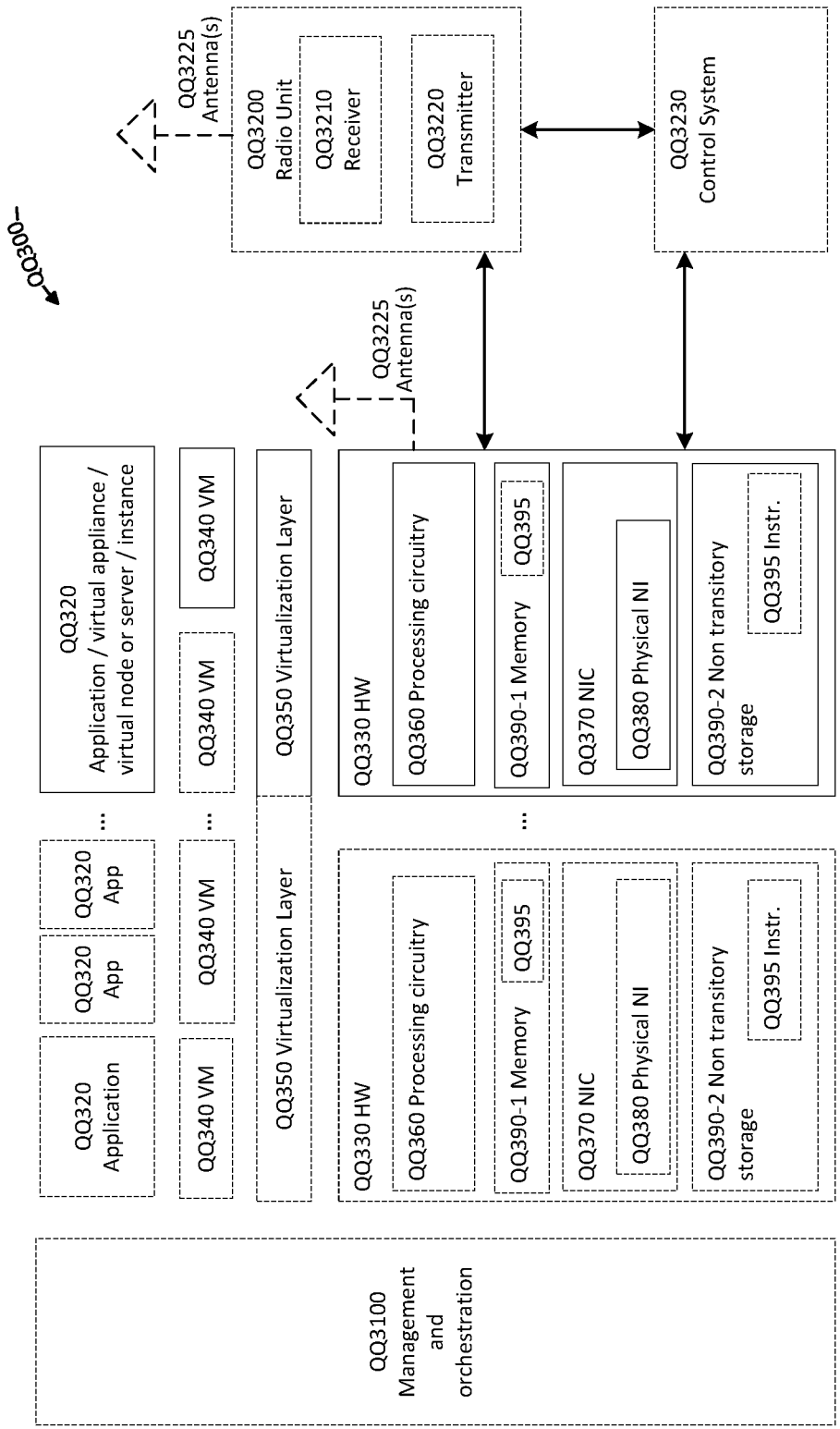
FIG. 11 is a block diagram of a virtualization environment in accordance with some embodiments.

FIG. 11: Virtualization Environment in Accordance with Some Embodiments

FIG. 11 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 11, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 11.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 12:
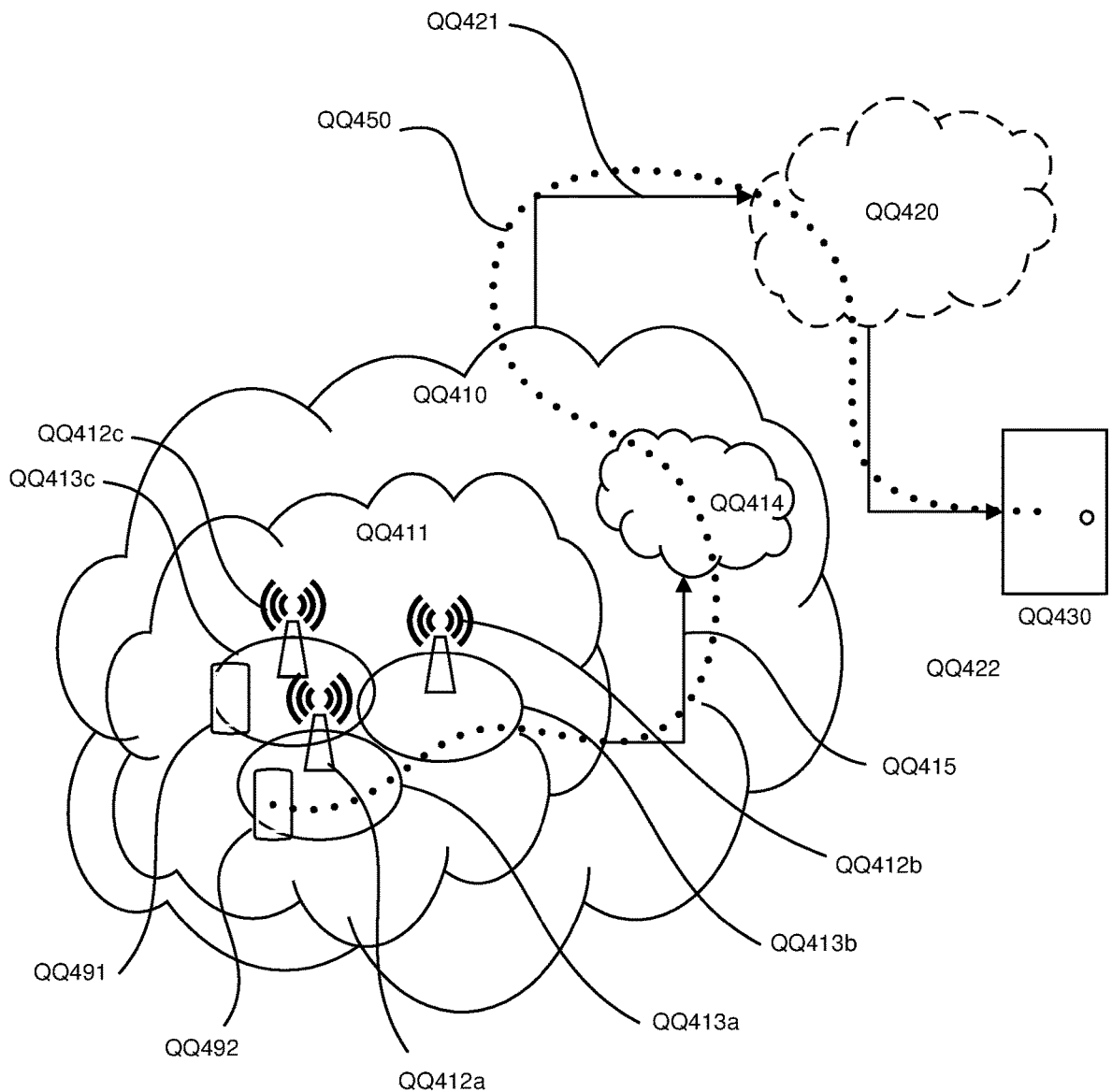
FIG. 12 is a block diagram of a telecommunication network connected via an intermediate network to a host computer in accordance with some embodiments.

FIG. 12: Telecommunication Network Connected Via an Intermediate Network to a Host Computer in Accordance with Some Embodiments.

With reference to FIG. 12, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 12 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 13:
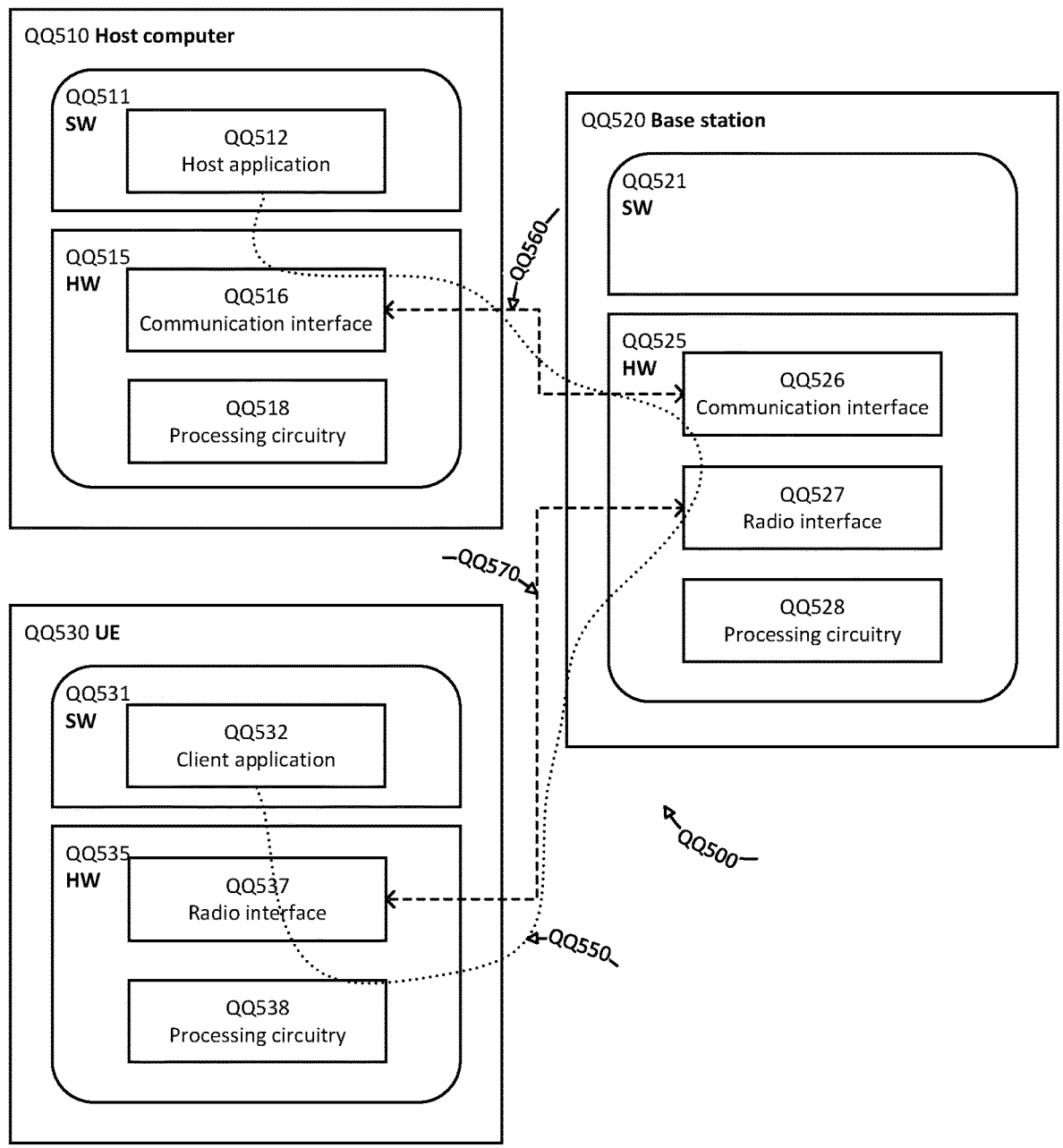
FIG. 13 is a block diagram of a host computer communicating via a base station with a user equipment over a partially wireless connection in accordance with some embodiments.

FIG. 13: Host Computer Communicating Via a Base Station with a User Equipment Over a Partially Wireless Connection in Accordance with Some Embodiments.

Example implementations, in accordance with an embodiment, of the UE, base station and host computer discussed in the preceding paragraphs will now be described with reference to FIG. 13. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 13) served by base station QQ520. Communication interface QQ526 may be configured to facilitate connection QQ560 to host computer QQ510. Connection QQ560 may be direct or it may pass through a core network (not shown in FIG. 13) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 13 may be similar or identical to host computer QQ430, one of base stations QQ412a, QQ412b, QQ412c and one of UEs QQ491, QQ492 of FIG. 12, respectively. This is to say, the inner workings of these entities may be as shown in FIG. 13 and independently, the surrounding network topology may be that of FIG. 12.

In FIG. 13, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 14:
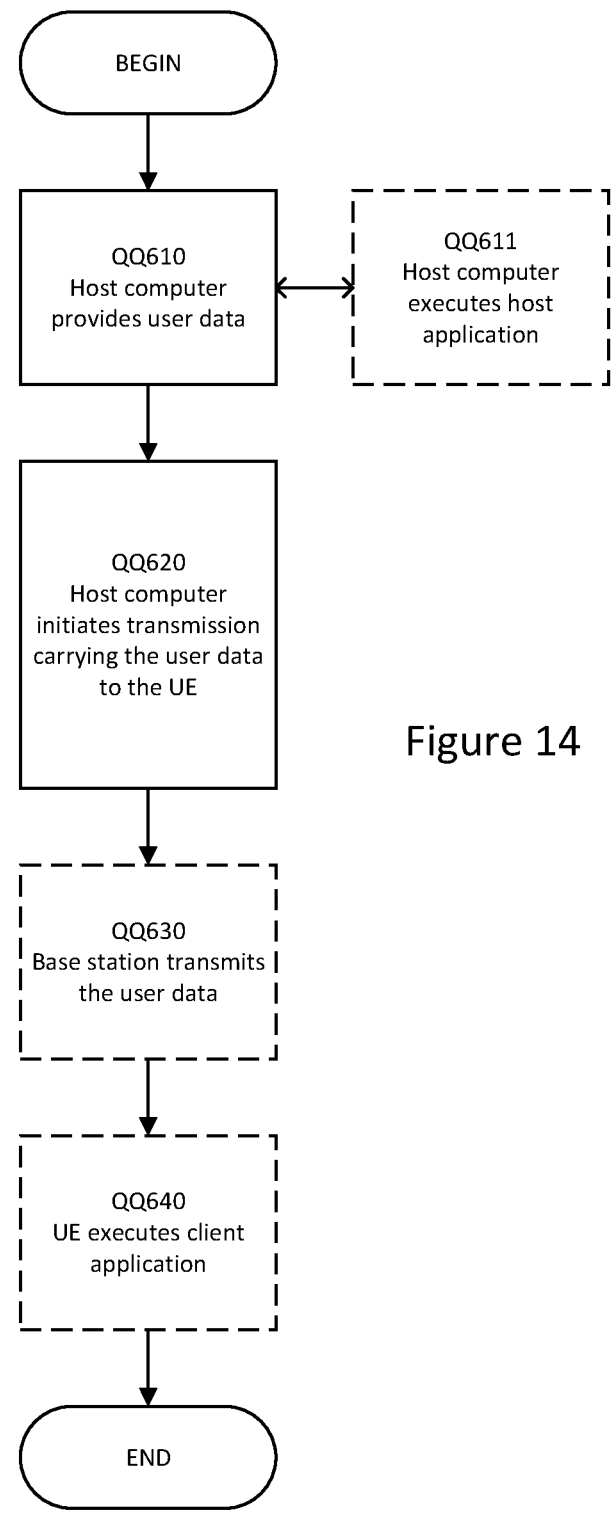
FIG. 14 is a block diagram of methods implemented in a communication system including a host computer, a base station and a user equipment in accordance with some embodiments.

FIG. 14: Methods Implemented in a Communication System Including a Host Computer, a Base Station and a User Equipment in Accordance with Some Embodiments.

FIG. 14 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 14 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 15:
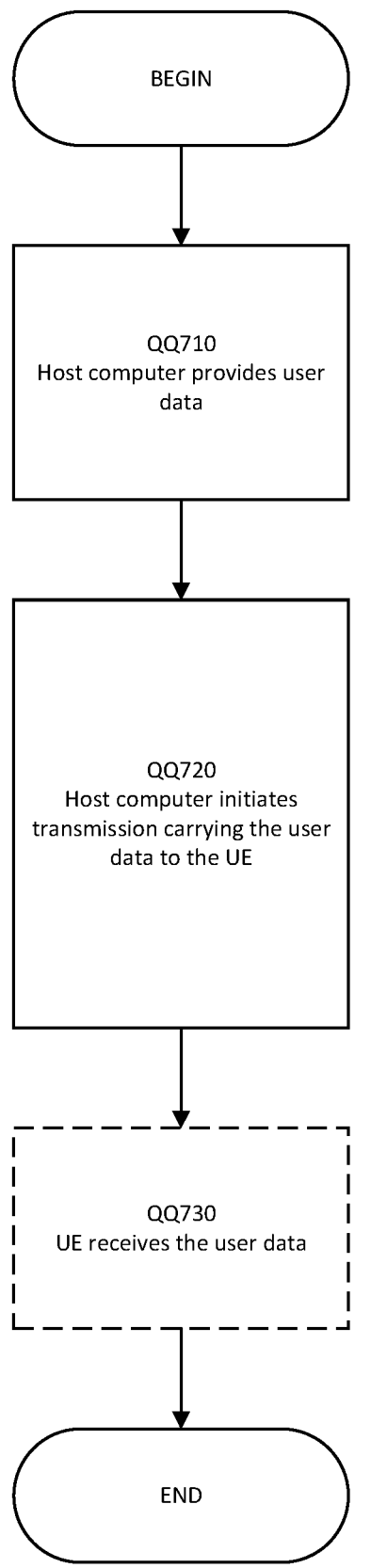
FIG. 15 is a block diagram of methods implemented in a communication system including a host computer, a base station and a user equipment in accordance with some embodiments.

FIG. 15: Methods Implemented in a Communication System Including a Host Computer, a Base Station and a User Equipment in Accordance with Some Embodiments.

FIG. 15 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 15 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 16:
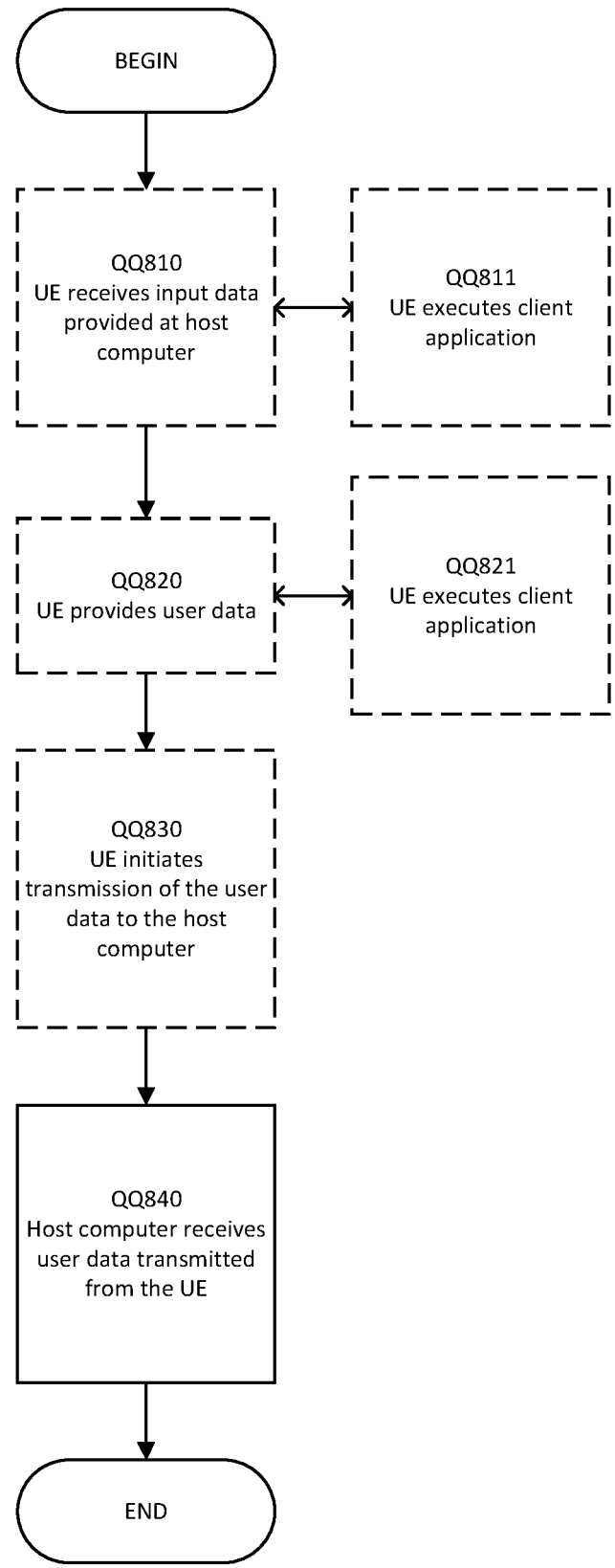
FIG. 16 is a block diagram of methods implemented in a communication system including a host computer, a base station and a user equipment in accordance with some embodiments.

FIG. 16: Methods Implemented in a Communication System Including a Host Computer, a Base Station and a User Equipment in Accordance with Some Embodiments.

FIG. 16 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 16 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 17:
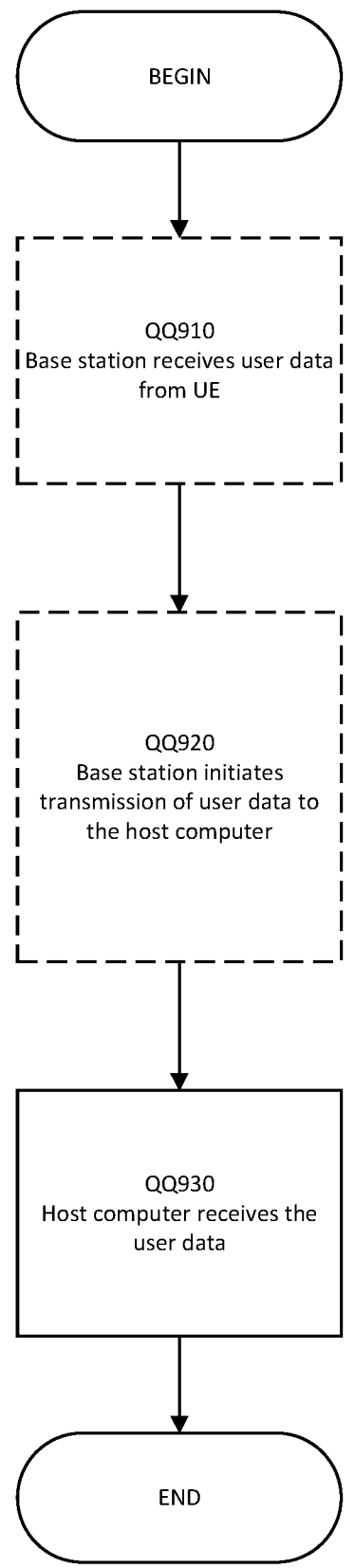
FIG. 17 is a block diagram of methods implemented in a communication system including a host computer, a base station and a user equipment in accordance with some embodiments.

FIG. 17: Methods Implemented in a Communication System Including a Host Computer, a Base Station and a User Equipment in Accordance with Some Embodiments.

FIG. 17 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 17 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

ADDITIONAL DISCUSSION

Some embodiments aim to investigate methods to further improve reliability and reduce latency for different use cases (such as factory automation, transport industry and electrical power distribution) that have different requirements. Some embodiments discuss enhancing PUSCH transmission to meet URLLC requirements.

Some embodiments provide, at least for scheduled PUSCH, that one UL grant scheduling two or more PUSCH repetitions that can be in one slot, and/or across the slot boundary in consecutive available slots" (also called as "mini-slot based repetitions"). Such embodiments may include time domain resource determination. Time domain resource information may provide that the time domain resource assignment field in the DCI indicates the resource for the first repetition; that the time domain resources for the remaining repetitions are derived based at least on the resources for the first repetition and the UL/DL direction of the symbols; to FFS the detailed interaction with the procedure of UL/DL direction determination; that each repetition occupies contiguous symbols and to FFS on whether/how to handle "orphan" symbols (the # of UL symbols is not sufficient to carry one full repetition).

The grant may further include frequency hopping (at least 2 hops) which support at least inter-PUSCH-repetition hopping and inter-slot hopping, FFS other FH schemes, and FFS number of hops larger than 2.

The grant may further include FFS dynamic indication of the number of repetitions, FFS DMRS sharing and FFS TBS determination (e.g. based on the whole duration, or based on the first repetition).

At least for scheduled PUSCH, for the option of one UL grant scheduling two or more PUSCH repetitions in consecutive available slots, with one repetition in each slot with possibly different starting symbols and/or durations" (also called as "multi-segment transmission"), if supported, the grant further consists of time domain resource determination in which the time domain resource assignment field in the DCI indicates the starting symbol and the transmission duration of all the repetitions, FFS multiple SLIVs indicating the starting symbol and the duration of each repetition, FFS details of SLIV, including the possibility of modifying SLIV to support the cases with S+L>14, and FFS the interaction with the procedure of UL/DL direction determination.

For the transmission within one slot, if there are more than one UL periods within a slot (where each UL period is the duration of a set of contiguous symbols within a slot for potential UL transmission as determined by the UE), then one repetition is within one UL period and FFS if more than one UL period is used for the transmission and each repetition occupies contiguous symbols. Otherwise, a single PUSCH repetition is transmitted within a slot following Rel-15 behavior. Frequency hopping may be supported in which support includes support for at least inter-slot FH and FFS other FH schemes.

FFS TBS determination may be provided and may be based on the whole duration, or based on the first repetition, overhead assumption.

Some embodiments may down-select between "mini-slot based repetitions" and "two-segment transmission" and/or FFS the option of using separate grants to schedule PUSCH repetitions in consecutive available slots.

Some embodiments include details of the time domain resource determination, including the interaction with the DL/UL direction of the symbols, details of TBS determination, and a determination regarding what is different for scheduled PUSCH and configured grant. For example, it may be determined, for a configured grant, whether the transmission should be allowed to be postponed when conflicting with DL symbol. A comparison between the two schemes, including the potential performance evaluation/analysis (including latency, reliability, etc.), complexity, overhead, etc. may be made. A multi-segment solution may consider the case where there are slots with more than one UL period and performance comparisons between mini-slot repetitions and multi-segment PUSCH may be made.

Different relevant use cases can be considered with potentially different reliability requirements. In some use cases, a very strict reliability of $1-10^6$ is required. It is worth noting that techniques for enhancing reliability can be done at different layers in the protocol stack. Requiring overall transmission reliability of $1-10^6$ does not necessarily mean that all the solutions must come from the physical layer. For example, NR supports higher layer reliability enhancement in the form of PDCP duplication. With PDCP duplication, the reliability requirement on the physical layer can be relaxed.

In NR Rel-15, a new CQI table for CQI report corresponding to 10-5 BLER target was introduced. This aims to support URLLC DL transmission with high reliability requirement. Moreover, a new MCS table supporting new MCS entries with low spectral efficiency values was introduced to support very robust PDSCH and PUSCH transmissions. These PHY reliability enhancements made in NR Rel. 15 can be considered sufficient for eURLLC.

In terms of latency, NR Rel. 15 supports data transmission with shorter duration than a slot. PDSCH/PUSCH mapping Type B allows a transmission to start in any symbol in a slot, which is highly desirable from a latency viewpoint. For PDSCH mapping Type B, transmission durations of 2, 4, and 7 symbols are supported, while for PUSCH mapping Type B, arbitrary symbol durations from 1 to 14 symbols are supported. These features serve as the key elements to enable low latency transmission required for URLLC.

However, there still exist some limitations in terms of scheduling flexibility in NR Rel-15 to fully enable ultra-low latency transmission. One example is the restriction on scheduling across the slot border. For URLLC services with strict latency budget, it is highly desirable that data can be transmitted as soon as possible. It could happen for example that UL data for an UL transmission is ready to be transmitted (after some processing time at the UE) in a symbol that is too close to the slot border. Since NR Rel. 15 does not allow transmissions to cross the slot border, the UE has to wait until the beginning of the next slot to transmit. This can lead to an increased latency which exceeds the allowed budget. Moreover, this restriction is extended to Rel. 16 at least for the grant-based transmission based on the following agreement that one PUSCH transmission instance is not allowed to cross the slot boundary at least for grant-based PUSCH.

Figure 18:
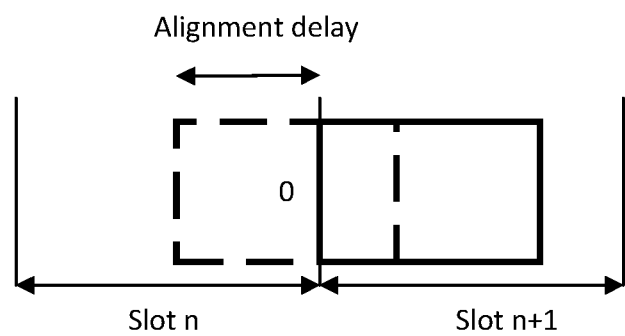
FIG. 18 is a block diagram illustrating a long alignment delay due to transmission across a slot border restriction according to some embodiments.

Reference is now made to FIG. 18, which is a block diagram illustrating a long alignment delay due to transmission across a slot border restriction according to some embodiments. For example, FIG. 18 is an illustration of high alignment delay when the arrival of data with 7-symbol duration is too close to the slot border. In the case of a 7-symbol transmission, this alignment delay will occur in 50% of UL transmissions assuming data arriving uniformly. The problem is especially severe for the UL transmission where UE is power-limited since increasing bandwidth does not help to improve the performance.

An alternative to waiting until the next slot is to schedule multiple transmissions with shorter duration so that the transmission can start already in the present slot. Although NR Rel. 15 supports slot aggregation where a transmission can be repeated over multiple slots, there is a limitation that the TB repetition in the next slots needs to have the same resource allocation as the transmission in the first slot. Therefore, the repetition of any transmission less than 14 symbols across multiple slots will have time gaps between them.

Figure 19:
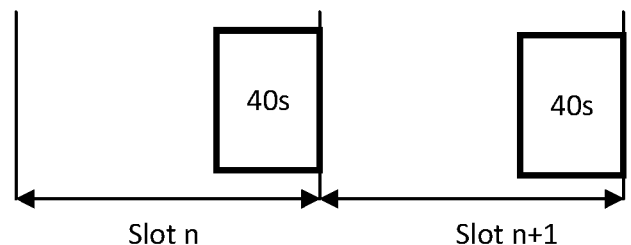
FIG. 19 is a block diagram illustrating slot aggregation in NR Rel. 15 when applied to repetition of short transmissions and provides an illustration of mini-slot aggregation, where 4os mini-slot allocation is repeated in two adjacent slots, separated by the 10os time gap between the mini-slots.

Reference is now made to FIG. 19, which is a block diagram illustrating slot aggregation in NR Rel. 15 when applied to repetition of short transmissions and provides an illustration of mini-slot aggregation, where 4os mini-slot allocation is repeated in two adjacent slots, separated by the 10os time gap between the mini-slots. Although the alignment delay is reduced, the overall latency is not improved with this approach as the receiver in most cases need to accumulate all the repetitions to be able to achieve the desired reliability.

To support truly ultra-low latency transmission for eURLLC in Rel. 16 in RAN1 #95 it was agreed to improve the latency by adopting one of the following solutions.

Some embodiments provide support one or more of: one UL grant scheduling two or more PUSCH repetitions that can be in one slot, or across slot boundary in consecutive available slots; one UL grant scheduling two or more PUSCH repetitions in consecutive available slots, with one repetition in each slot with possibly different starting symbols and/or durations; N (N>=2) UL grants scheduling N PUSCH repetitions on consecutive available slots, with one repetition in each slot, and the i-th UL grant can be received before the end of the PUSCH transmission scheduled by the (i−1)th UL grant; and FFS the definition of available slots. The first two of the above alternatives may be referred to as mini-slot based repetitions and multi-segment transmission.

A couple of considerations should be taken with respect to mini-slot repetition. The DMRS overhead in each repetition creates unnecessary additional overhead. Therefore, additional mechanism should be considered to reduce DMRS overhead. Secondly repetition-based solution would not guarantee that the symbols around the slot boundary are fully utilized for the PUSCH transmission to reduce the delay. Depending on the data arrival and the allocated PUSCH resource, the repetition factor should be dynamically adapted. Since in Rel-15, slot-aggregation is RRC configured, introducing this feature implies that the dynamic repetition should be supported in Rel-16 to make the feature meaningful.

Some embodiments provide that multi-segment transmission is the most efficient one. From the performance perspective, splitting the PUSCH into two PUSCH has an advantage due to improved coding gain in one of the segments as compared to the repetition-based solutions.

Also, the third alternative seems inefficient in terms of UL grant efficiency and we believe that the multiple PUSCH repetition can be achieved by using a single UL grant.

Figure 20:
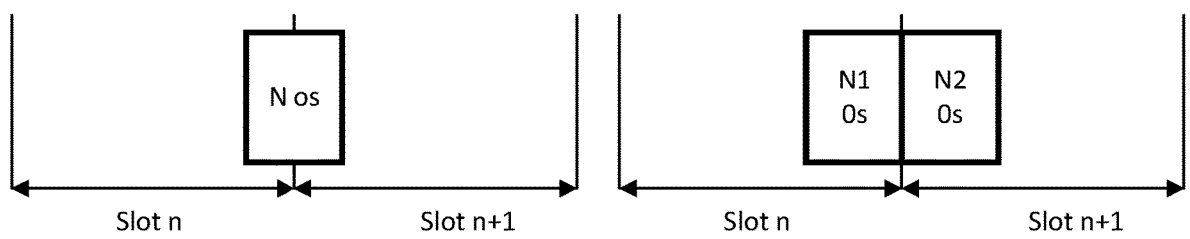
FIG. 20 is a block diagram illustrating a two segment PUSCH transmission according to some embodiments.

Reference is now made to FIG. 20, which is a block diagram illustrating a two segment PUSCH transmission according to some embodiments. This figure helps explain how multiple grants can be scheduled using a single UL grant. That is, a UE can expect to receive an UL grant or a configured UL grant which assign resources in time domain crossing the slot border. The UE then interprets that PUSCH transmission is split into two PUSCH transmissions. In the left graphic the UL data with N-symbol duration is configured or scheduled to cross the slot border. In the right graphic the UL data is split into two segments. The first PUSCH starts at the configured or assigned starting symbol and ends at the end of the present slot. The second PUSCH starts at the beginning of the subsequent slot and ends at the symbol corresponding to the original configured or scheduled length.

A simple signaling method can, e.g., be based on an implicit signaling by allowing direct indicators of start symbol (S) and allocation length (L) in the time-domain resource allocation to result in S+L>14. In this case, the first PUSCH segment starting at the configured or scheduled starting symbol and lasting until the end of the first slot, and the second PUSCH segment starting immediately in the subsequent slot until the end of scheduled symbol, or symbol 14, whichever comes first. The same TB can be used for both segments of PUSCH transmission and RV can follow a pre-configured RV sequence. For TBs requiring transmission in more than two slots, similar segmentation of PUSCH transmission is applied.

During RAN1 1901 Ad-Hoc, concerns were raised how to handle slots with a TDD pattern resulting in more than one UL period per slot if multi-segment PUSCH is adopted. Assume that we use the signaling method based on signaling a starting point S and length of transmission L, where S+L is allowed to be larger than 14. If there is more than one UL period contained in the interval between S and S+L, the UE only transmits on those symbols where it is allowed to, and each set of consecutive UL symbols within a single slot will constitute a segment. This is consistent with the intention of multi-segment PUSCH which is to segment as few times as possible in order to reduce complexity. Reference is now made to FIG. 21, which is a block diagram illustrating segmenting with more than one UL period in a slot according to some embodiments. As illustrated, the example provides that S=0 and L=28. In this case there are two UL periods per slot as given by the TDD pattern, and hence there are two segments per slot.

In addition, the reliability can be improved by frequency hopping. However, consideration should be taken into account whether frequency hopping results in fragmented spectrum, impacting the total system performance. Therefore, frequency hopping should be dynamically enabled or disabled. Moreover, frequency hopping if enabled, can be performed based on the existing inter-slot and intra-slot frequency hopping. In some cases, it may however not be desirable to have a hopping position in asymmetric fashion with respect to PUSCH allocation. In that case, it is possible to consider a hopping pattern where the hopping position is based on intra-slot frequency hopping of either of the repetitions with some rule, e.g., the slot where there is larger number of symbols.

Based on the above discussion and performance observations later in the contribution, we propose the following embodiments may include adopting multi-segment PUSCH, where one TB is carried by multiple PUSCH transmissions in consecutive available slots with one segment per UL period.

Some embodiments include determining transport block size when repeating mini-slots. When scheduling a PUSCH transmission, the target code rate and modulation order is determined from the MCS index signaled in DCI typically. The transport block size is then calculated from the target code rate, modulation order, number of layers, and the allocated resources as described in Section 6.1.4.2 of TS 38.214.

In the following, the issues of the Rel-15 procedure are analyzed, when (mini-)slot aggregation is applied.

For reduced scheduling flexibility, in the case of slot aggregation of Rel-15, the transport block size is determined using parameters for the first slot, and the same transport block size is then used in each of the aggregated slots. The same approach can be used for mini-slot repetition, where the transport block size is determined by the amount of allocated resources in the first mini-slot, together with a signaled target code rate and modulation order. One drawback of this is that it can affect scheduling flexibility. With repetitions, if a TB needs to be transmitted with low MCS indices, very large bandwidth is required. In some cases, it is not even possible to schedule the given TB using some MCS indices since the required bandwidth would be too large. We illustrate this problem by considering three different ways of transmitting an 8 OS long PUSCH, either by 4 repetitions of a 2 OS long PUSCH, by 2 repetitions of a 4 OS long PUSCH, or a single 8 symbol long PUSCH.

The first two options represent the case where the TBS is determined based on parameters for the first transmission, then the TB is repeated multiple times. The third option represents the case where the TBS is determined based on the total amount of resource used for the TB.

Three different target packet sizes from the evaluation assumptions are considered, 100 bytes, 250 bytes, or 1370 bytes. In an assumed BW of 40 MHz and SCS=30 kHz, give a maximum number of PRBs equal to 106 for CP-OFDM. According to the MCS table below, we examine all MCS indices find the number of PRBs needed to support the target TBS. Sometimes the same number of PRBs gives close to equal TBS when using adjacent MCS indices. In this case we select the MCS index with the smallest spectral efficiency, corresponding to the highest reliability.

| | Target TBS = 100 bytes | | | | | |
|---|---|---|---|---|---|---|
| | 2 OS, 4 repetitions | | 4 OS, 2 repetitions | | 8 OS, 1 repetition | |
| | MCS | NPRB | MCS | NPRB | MCS | NPRB |
| Smallest MCS | 11 | 88 | 6 | 92 | 2 | 95 |
| Largest MCS | 28 | 15 | 28 | 5 | 24 | 3 |

| | Target TBS = 250 bytes | | | | | |
|---|---|---|---|---|---|---|
| | 2 OS, 4 repetitions | | 4 OS, 2 repetitions | | 8 OS, 1 repetition | |
| | MCS | NPRB | MCS | NPRB | MCS | NPRB |
| Smallest MCS | 17 | 96 | 10 | 90 | 6 | 99 |
| Largest MCS | 28 | | 28 | | 26 | 6 |

| | Target TBS = 1379 bytes | | | | | |
|---|---|---|---|---|---|---|
| | 2 OS, 4 repetitions | | 4 OS, 2 repetitions | | 8 OS, 1 repetition | |
| | MCS | NPRB | MCS | NPRB | MCS | NPRB |
| Smallest MCS | | | 23 | 100 | 15 | 98 |
| Largest MCS | | | 28 | | 28 | 29 |

In the examined cases, basing the TBS determination on the number of resources available in the first repetition leads to worse flexibility in the available {MCS, NPRB} combinations for achieving the target TBS, as compared to basing TBS determination on the total number of resources. For example, for all three TB sizes above, option (a) provides less {MCS, NPRB} flexibility than option (c). By flexibility here we mean the range of MCS and NPRB that can be used in the transmission. For instance, in the table on the top, with 8 OS and 1 repetition, it is possible to MCS indices from 2 to 24 and NPRB from 3 to 95, which means that depending on the channel quality, a small or large allocation, as well as a low or high MCS can be used. However, in the first column of the table on the top with 2 OS and 4 repetitions, the range of MCSs is smaller (the lowest MCS index is 11) and also the smallest allocation is 15 PRBs. With large TBS sizes the situation is even worse, and as the last table shows it is not even possible to transmit the TBS in only 2 OS and 4 repetitions case.

Another advantage of basing the TBS on the total number of resources available is that it is possible to change the TBS both by changing the number of PRBs allocated as well as the number of OFDM symbols. It is not as easy to change the TBS when using (mini-)slot aggregation and Rel-15 TBS determination procedure, where the number of OS in the first transmission may need to stay fixed to keep the alignment delay low. Changing the number of repetitions only changes the total transmission length but, does not change the number of OS in the first transmission, which is used to determine the TBS in Rel-15.

Basing the TBS determination on the allocated resources in the first transmission can lead to inflexible scheduling, and poor usage of the MCS table.

In the examined cases, it is not possible to reach the lowest spectral efficiency in the Rel-15 MCS table even with 1 repetition when using the full bandwidth. Thus, using more repetitions and basing TBS determination on the allocated resources in the first transmission does not give noticeable gains in spectral efficiency compared to the Rel-15 MCS table.

TBS determination is enhanced to be based on the total amount of occupied resources.

In some embodiments, there is a mismatch in modulation order and base graph. When (mini-slot) aggregation with K repetition is used, the transmission uses {RMCS,K, QMCS,K, K}, where RMCS,K is the code rate signaled by the MCS index, QMCS,K is the modulation order signaled by the MCS index, K is the number of repetitions.

Alternatively, if assuming the MCS is selected according to the total amount of occupied resources, the TBS would be sent with {RMCS,1, QMCS,1, 1}.

When applying the Rel-15 approach, RMCS,1 could deviate so much from RMCS,K, such that QMCS,1☐ QMCS,K. When this happens, the link performance will suffer significantly. The reason is that in this case the base graph in this case does not match the new modulation order, since the base graphs are optimized for different code rates. To illustrate this, we compare two cases of (A)—4 repetitions of a 2OS PUSCH and (B)—1 repetition of an 8 OS PUSCH.

Figure 22:
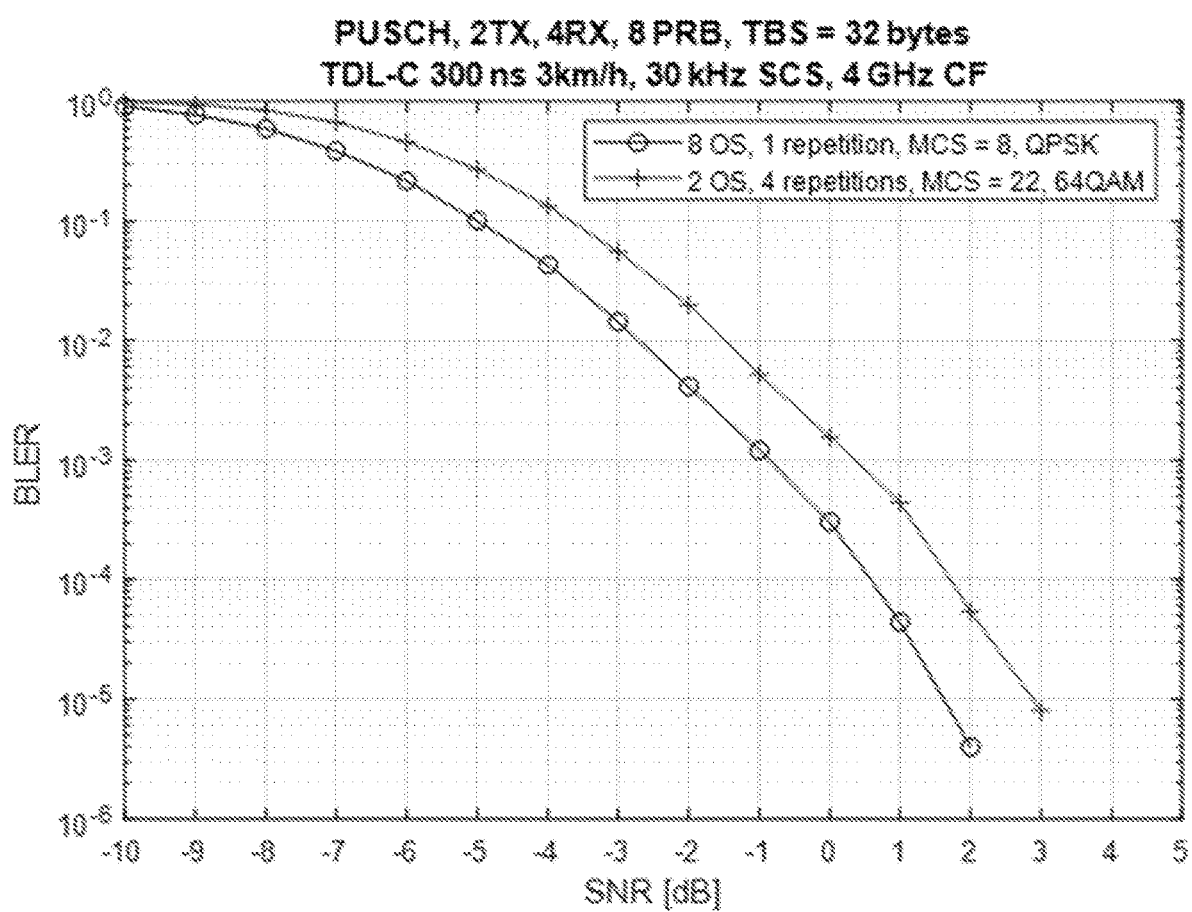
FIG. 22 is a graph illustrates a plot of BLER performance degradation when improper modulation order is used in mini-slot aggregations according to some embodiments.

For the first case (A), the first OFDM symbol is occupied by DMRS, followed by 7 OFDM symbols occupied by PUSCH payload. For the second case (B), DMRS is artificially made to occupy only the first OFDM symbol of the first repetition, so that the same DMRS overhead (=1 os) is used in both cases. A target TBS of 32 or 100 bytes is used. The BLER performance of (A) vs (B) is shown in FIG. 22 below, using the assumed transmission parameters. Briefly referring to FIG. 22, a graph illustrates a plot of BLER performance degradation when improper modulation order is used in mini-slot aggregations according to some embodiments.

Figure 23:
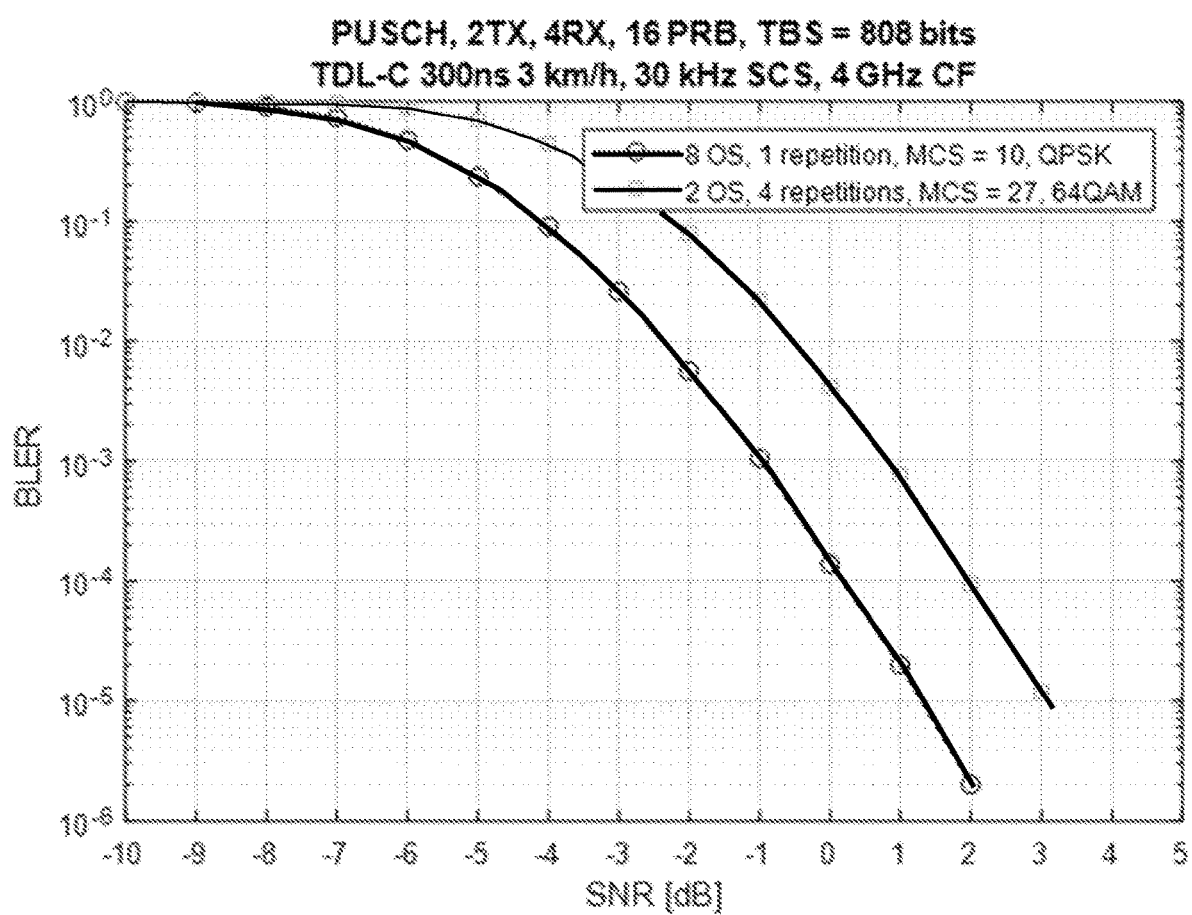
FIG. 23, a graph illustrates a plot of BLER performance degradation when improper modulation order is used in mini-slot aggregations according to some embodiments.

Referring to FIG. 23, a graph illustrates a plot of BLER performance degradation when improper modulation order is used in mini-slot aggregations according to some embodiments.

We see that (A) with 4 repetitions performs about 1.5-1.8 dB worse than (B) with 1 repetition. The reason is, (A) uses {RMCS,4, QMCS,4=64QAM, K=4}, (B) uses {RMCS,1☐ RMCS,4/16, QMCS,1=QPSK, 1} which is the right choice when taking into account all occupied resources.

In the case with target TBS=800 bits, a similar problem occurs to the base graph selection as well, since base graph selection is partly determined by the target code rate in the MCS. Since the target code rate is above 0.67, the base graph switches from BG2 to BG1. Since the mother code rate of BG1 is 1/3, and the mother code rate of BG2 is 1/5, this also impacts performance negatively due to circular buffer repetition being used below rate 1/3 for BG1 instead of fresh parity bits.

When (mini-)slot aggregation is used, basing the TBS determination on the allocated resources in the first transmission may lead excessively high target code rate, resulting in modulation order and base graph mismatch.

Some embodiments provide channel coding considerations when comparing mini-slot based repetitions and multi-segment PUSCH.

The rate matching and bit-selection methods for NR LDPC codes are based on circular buffer rate matching together with predefined starting points, or redundancy versions, in the circular buffer. The LDPC basegraphs were designed through code extension, by first designing a high rate kernel, and then extending the parity check matrix with single parity check variable nodes. The coded bits are written into the circular buffer in the same order, starting with the systematic bits, followed by parity bits in the order in which the matrix was extended. This has the effect of creating an optimal order in which to read out the bits form the circular buffer when choosing coded bits to be transmitted. Systematic bits are more important than parity bits, and for optimal performance the parity bits should be read out of the circular buffer in the order in which the matrix was extended. For HARQ-based retransmissions, ideally the second transmissions should start reading out bits exactly where the first transmission stopped reading bits in the circular buffer. Instead four different possible starting positions in the circular buffer were defined as a trade-off between performance and signaling overhead. This consideration has a direct impact on the performance when comparing mini-slot based repetitions and multi-segment PUSCH. For each segment, or mini-slot, one of the RVs is chosen, which makes it more difficult to select the coded bits in the optimal order.

Figure 24:
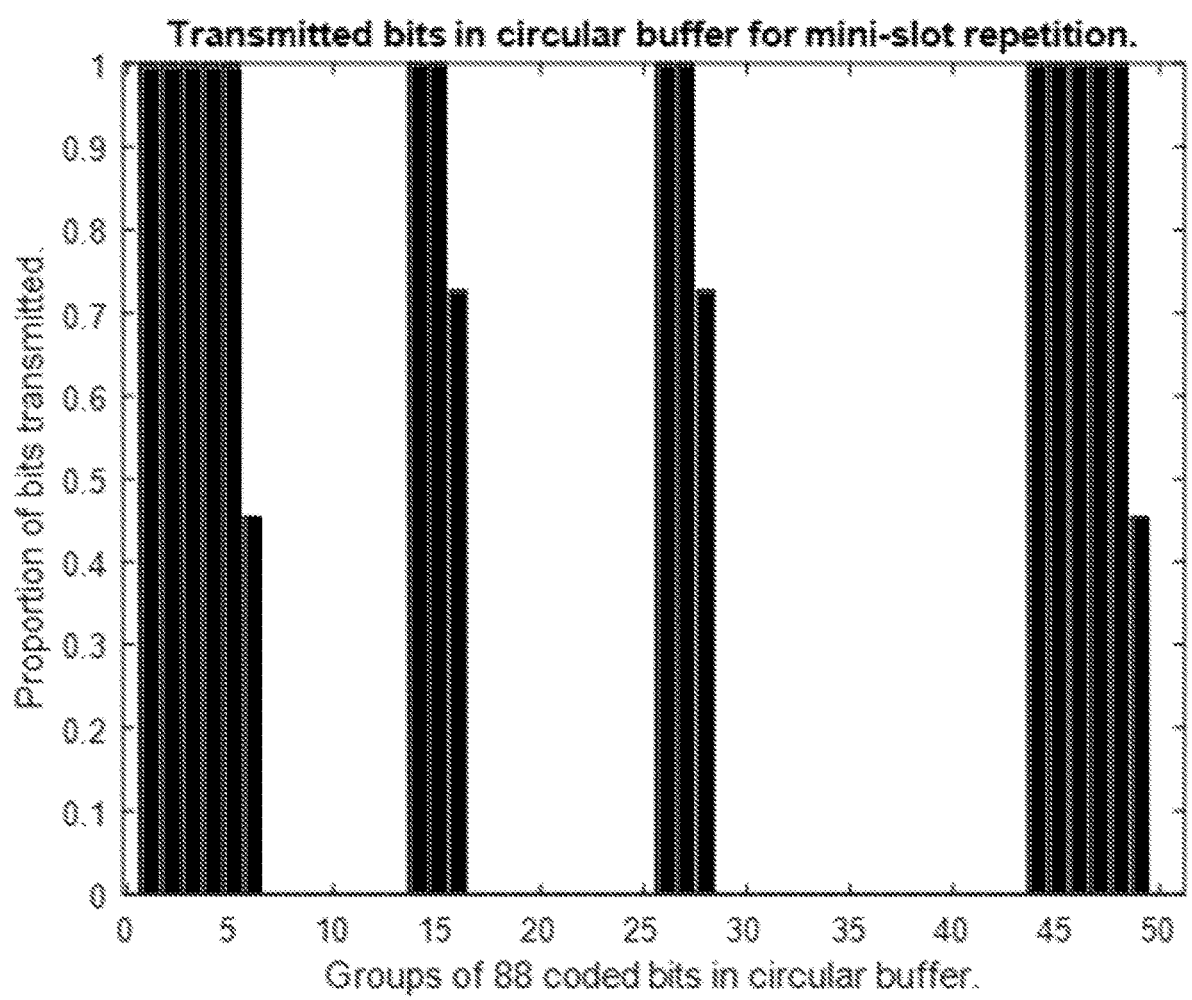
FIG. 24 is a bar graph illustrating circular buffer usage for mini-slot repetition according to some embodiments.
Figure 25:
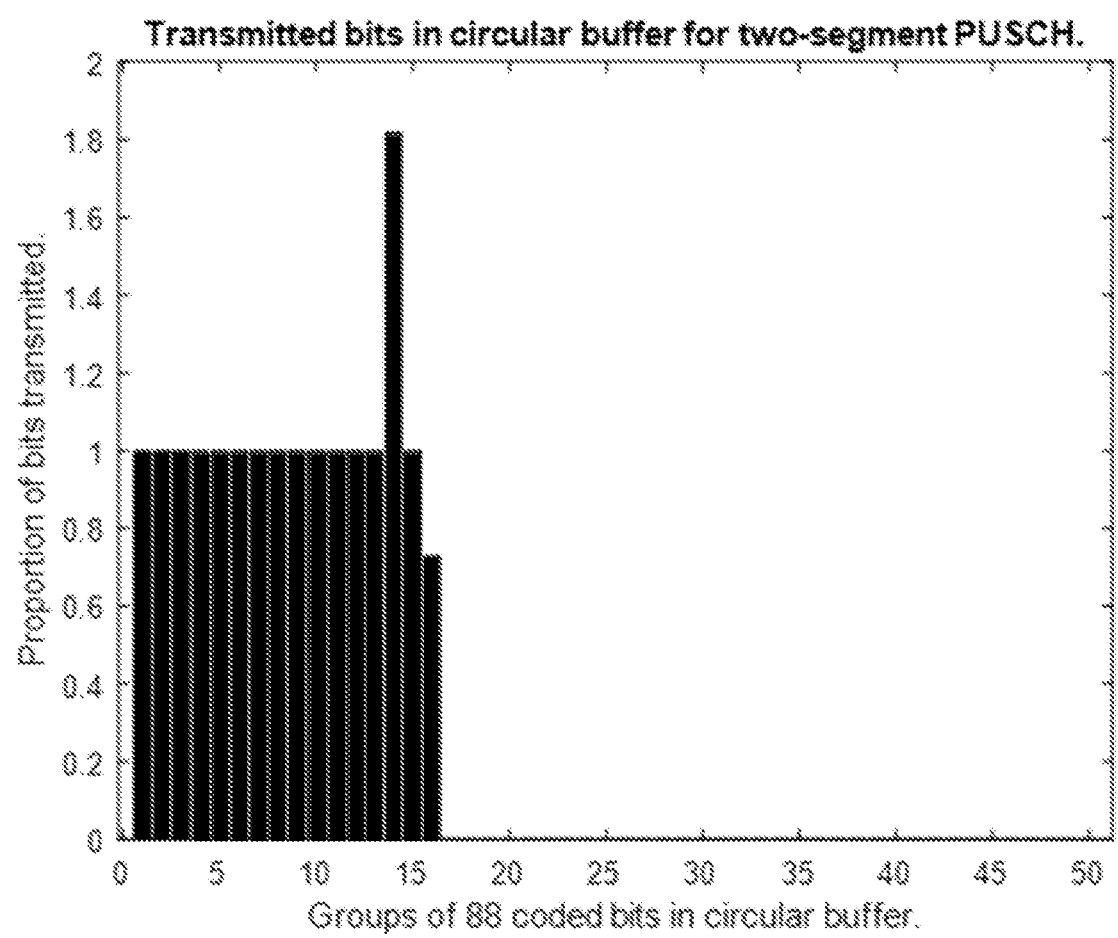
FIG. 25 is a bar graph illustrating circular buffer usage for two segment PUSCH according to some embodiments.

Consider the following example where we compare a two-segment PUSCH transmission with segments of length 2 and 6 with mini-slot based repetition of 4 mini-slots of length 2 symbols each. We assume that each PUSCH segment contains one symbol dedicated to DMRS, and that DMRS sharing is used for the mini-slot based repetitions with one DMRS in the first repetition and one DMRS in the third repetition. Thus, we have the same DMRS overhead in both cases. Assume QPSK modulation with 10 PRBs allocated and a TBS of 848 bits. In total there are 1440 transmitted coded bits. We choose an RV order for consecutive repetitions or segments from the sequence {0, 2, 3, 1} in order to come as close to the optimal reading order in the circular buffer, which is to read starting from the beginning. We illustrate the bits used from the circular buffers in these two cases in FIG. 24 and FIG. 25. For example, FIG. 24 is a bar graph illustrating circular buffer usage for mini-slot repetition and FIG. 25 is a bar graph illustrating circular buffer usage for two segment PUSCH according to some embodiments. Each column in the figure corresponds to one column in the base matrix before lifting, or 88 coded bits after lifting. The height of each bar corresponds to the proportion of bits in this group that is transmitted, with height larger than 1 meaning that some bits in the are repeated. The first 8 columns correspond to systematic bits, and we notice that for mini-slot repetition it is not possible to transmit all systematic bits, no matter in which order we choose the RVs. We also see that the selected bits are spread out almost equally in the circular buffer, due to cyclically choosing between the RVs in sequence. In the case with two segment PUSCH on the other hand we can choose the longer segment to correspond to RV 0, and read a large number of consecutive bits from the beginning of the buffer.

Segmenting into more segments than necessary leads to shorter consecutive reads from the circular buffer and suboptimal selection of coded bits from the circular buffer.

Figure 26:
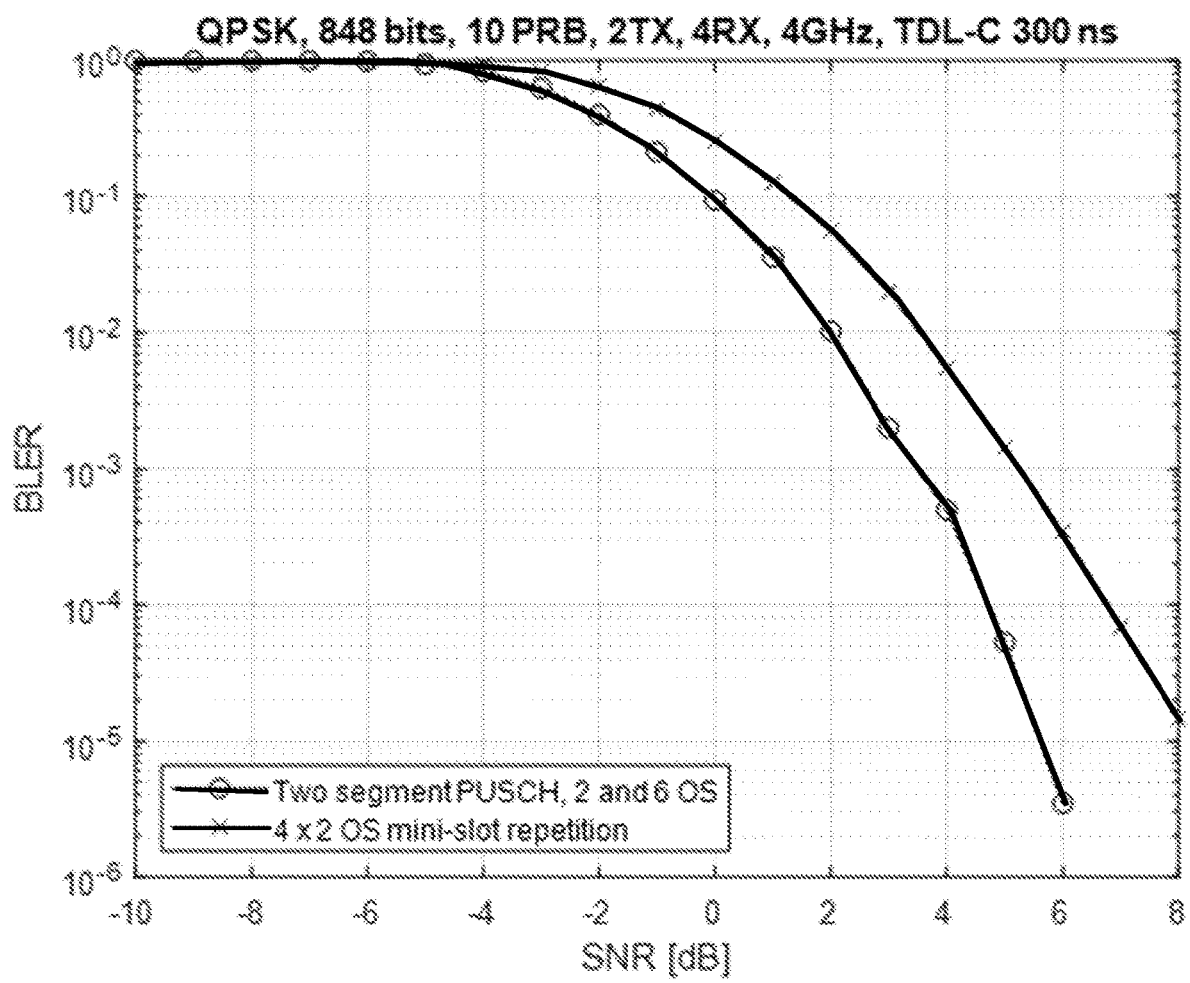
FIG. 26 is a graph plotting a performance comparison between mini-slot repetition and two segment PUSCH according to some embodiments.

Note that this has a direct impact on the performance of the two schemes. Two segment PUSCH outperforms mini-slot repetitions by more than 2 dB at BLER 1e-5 as shown in FIG. 26, which is a graph plotting a performance comparison between mini-slot repetition and two segment PUSCH according to some embodiments. For example, note that the multi-segment PUSCH performs better than mini-slot repetition.

How to enhance PUSCH transmission to meet the URLLC requirements is discussed herein.

Basing the TBS determination on the allocated resources in the first transmission can lead to inflexible scheduling, and poor usage of the MCS table.

In the examined cases, it is not possible to reach the lowest spectral efficiency in the Rel-15 MCS table even with 1 repetition when using the full bandwidth. Thus, using more repetitions and basing TBS determination on the allocated resources in the first transmission does not give noticeable gains in spectral efficiency compared to the Rel-15 MCS table.

When (mini-)slot aggregation is used, basing the TBS determination on the allocated resources in the first transmission may lead excessively high target code rate, resulting in modulation order and base graph mismatch.

Segmenting into more segments than necessary leads to shorter consecutive reads from the circular buffer and suboptimal selection of coded bits from the circular buffer.

Multi-segment PUSCH performs better than mini-slot repetition.

Based on the discussion in the previous sections the following is proposed: adopt multi-segment PUSCH, where one TB is carried by multiple PUSCH transmissions in consecutive available slots with one segment per UL period.

TBS determination is enhanced to be based on the total amount of occupied resources.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a network node in a wireless telecommunication network, the method comprising:

generating a configuration message that comprises transmit format data corresponding to a multiple segment transmission on a physical shared channel, the transmit format data comprising a combination of starting point and length of transmission data, and an indication of which symbols are used for transmission; and initiating the transmission of the configuration message to a user equipment, UE, to identify the transmit format data for the multiple segment transmission.

2. The method of claim 1, wherein the physical shared channel comprises a physical uplink shared channel (PUSCH) or a physical downlink shared channel (PDSCH).

3. The method of claim 1, wherein the configuration message comprises RV determination data and the RV determination data is determined by an initial RV for an initial PUSCH segment and a next RV in an RV sequence.

4. The method of claim 1, wherein an SFI, slot format indicator, DCI message is used to determine which symbols are used for UL transmission.

5. The method of claim 1, wherein RRC signaling is used to determine which symbols are used for UL transmission.

6. The method of claim 1, wherein the configuration message comprises TDRA table data associated with a TDRA table and wherein a row in the TDRA table is associated with a plurality of combinations of start symbol identifier and a symbol length value.

7. The method of claim 1, wherein the transmit format data further comprises at least one of:
transport block size (TBS) determination data;
redundancy version (RV) determination data;
time domain resource allocation (TDRA) table data; and/or
demodulated reference signal (DMRS) data for multiple segment transmission.

8. A base station (gNB) of a wireless communication network,
the base station comprising:
a transceiver configured to provide wireless network communication with a wireless terminal; and
a processor coupled with the transceiver, wherein the processor is configured to:
provide wireless network communications through the transceiver;
generate a configuration message that comprises transmit format data corresponding to a multiple segment transmission on a physical shared channel, the transmit format data comprising a combination of starting point and length of transmission data, and an indication of which symbols are used for UL transmission; and
initiate transmission of the configuration message to a user equipment, UE, to identify the transmit format data for the multiple segment transmission.

9. The method of claim 8, wherein the transmit format data further comprises at least one of:
TBS determination data;
RV determination data;
TDRA table data; and/or
DMRS data for multiple segment transmission.

10. A method of operating a wireless device in a wireless telecommunication network, the method comprising:

receiving a configuration message that comprises transmit format data corresponding to a multiple segment transmission on a physical shared channel, the transmit format data comprising a combination of starting point and length of transmission data, and an indication of which symbols are used for UL transmission; and initiating at least one of sending and receiving the multiple segment transmission on the physical shared channel based on the configuration message.

11. The method of claim 10, wherein the physical shared channel comprises a physical uplink shared channel (PUSCH) or a physical downlink shared channel (PDSCH).

12. The method of any of claim 10, wherein the configuration message comprises RV determination data and the RV determination data is determined by an initial RV for an initial PUSCH segment of the multiple segment transmission and a next RV in an RV sequence.

13. The method of claim 12, wherein the initial RV for the initial PUSCH segment is provided by a radio resource control, RRC, signal or an RV field in an activation downlink control indicator (DCI).

14. The method of claim 12, wherein the RV sequence is used cyclically.

15. The method of claim 10, wherein an SFI, slot format indicator, DCI message is used to determine which symbols are used for UL transmission.

16. The method of claim 10, wherein RRC signaling is used to determine which symbols are used for UL transmission.

17. The method of claim 10, wherein the transmit format data further comprises at least one of:
TBS determination data;
RV determination data;
TDRA table data; and/or
DMRS data for multiple segment transmission.

18. A first wireless device (UE) comprising:
a transceiver configured to provide wireless network communication with a wireless communication network; and
a processor coupled with the transceiver, wherein the processor is configured to:
provide wireless network communication through the transceiver, and
receive a configuration message that comprises transmit format data corresponding to a multiple segment transmission on a physical shared channel, the transmit format data comprising a combination of starting point and length of transmission data, and an indication of which symbols are used for UL transmission; and
initiate at least one of sending and receiving the multiple segment transmission on the physical shared channel based on the configuration message.

19. The method of claim 18, wherein the transmit format data further comprises at least one of:
TBS determination data;
RV determination data;
TDRA table data; and/or
DMRS data for multiple segment transmission.

* * * * *

UNITED STATES PATENT AND TRADEMARK OFFICE
CERTIFICATE OF CORRECTION

PATENT NO. : 12,245,078 B2
APPLICATION NO. : 17/429730
DATED : March 4, 2025
INVENTOR(S) : Andersson et al.

Page 1 of 1

It is certified that error appears in the above-identified patent and that said Letters Patent is hereby corrected as shown below:

In the Specification

In Column 3, Lines 9-10, delete "$N'_{RE}(\Sigma_{i=1}^{N_t} N_{SC}^{RB} \cdot N_{symb,i}^{sh} - N_{DMRS,i}^{PRB}) - N_{oh}^{PRB}$" and insert -- $N'_{RE} = (\Sigma_{i-1}^{N_t} N_{SC}^{RB} \cdot N_{symb,i}^{sh} - N_{DMRS,i}^{PRB}) - N_{oh}^{PRB}$ --, therefor.

In Column 3, Lines 26-27, delete "$N'_{RE}(\Sigma_{i=1}^{N_t} N_{SC}^{RB} \cdot N_{symb,i}^{sh} - N_{DMRS,i}^{PRB}) - N_{oh}^{PRB}$" and insert -- $N'_{RE} = (\Sigma_{i-1}^{N_t} N_{SC}^{RB} \cdot N_{symb,i}^{sh} - N_{DMRS,i}^{PRB}) - N_{oh}^{PRB}$ --, therefor.

In Column 6, Line 59, delete "$N_{BWPj}^{size} - 1,$" and insert -- $N_{BWP,i}^{size} - 1,$ --, therefor.

In Column 8, Lines 5-6, delete "physical layer downlink control channel (PDCCH)." and insert -- physical downlink control channel (PDCCH). --, therefor.

In Column 10, Line 51, delete "LUE" and insert -- UE --, therefor.

In Column 10, Line 53, delete "LUE" and insert -- UE --, therefor.

In Column 53, Line 36, delete "form" and insert -- from --, therefor.

Signed and Sealed this
Twenty-first Day of October, 2025

John A. Squires
*Director of the United States Patent and Trademark Office*